US008285567B2

(12) United States Patent
Shafer

(10) Patent No.: US 8,285,567 B2
(45) Date of Patent: *Oct. 9, 2012

(54) APPARATUS AND METHOD OF WORKERS' COMPENSATION COST MANAGEMENT AND QUALITY CONTROL

(75) Inventor: Rebecca A. Shafer, Mansfield Center, CT (US)

(73) Assignee: Safety National Casualty Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/895,807

(22) Filed: Sep. 30, 2010

(65) Prior Publication Data

US 2012/0022897 A1    Jan. 26, 2012

Related U.S. Application Data

(63) Continuation-in-part of application No. 11/839,483, filed on Aug. 15, 2007, now Pat. No. 7,856,367.

(60) Provisional application No. 60/837,586, filed on Aug. 15, 2006.

(51) Int. Cl.
*G06Q 40/00* (2012.01)

(52) U.S. Cl. ............ 705/4; 705/5; 705/30; 705/35; 705/36 R; 709/203; 709/206

(58) Field of Classification Search .......... 705/1, 4, 705/7, 30, 35, 36 R, 5; 707/3, 5; 709/203, 709/206
See application file for complete search history.

(56) References Cited

U.S. PATENT DOCUMENTS

| 6,604,080 | B1 * | 8/2003 | Kern .................................. 705/4 |
| 7,636,665 | B2 * | 12/2009 | Cooperstone et al. ......... 705/1.1 |
| 7,856,367 | B2 * | 12/2010 | Shafer .............................. 705/4 |
| 7,937,329 | B1 * | 5/2011 | Cooperstone et al. ........ 705/322 |
| 8,060,394 | B2 * | 11/2011 | Woodings et al. ........... 705/7.13 |
| 2001/0044735 | A1 | 11/2001 | Colburn et al. |
| 2004/0267595 | A1 * | 12/2004 | Woodings et al. ................ 705/9 |
| 2008/0154672 | A1 | 6/2008 | Skedsvold |
| 2010/0211515 | A1 * | 8/2010 | Woodings et al. ............ 705/320 |
| 2012/0078924 | A1 * | 3/2012 | Woodings et al. ............ 707/754 |

OTHER PUBLICATIONS

Ellen Barre Spiegel and Bill Spiegel. Weighing the Value of Cost Containment in a Workers Comp Plan, Jan. 2007, American Agent & Broker, vol. 79, No. 1, pp. 34-39.

* cited by examiner

*Primary Examiner* — James Trammell
*Assistant Examiner* — McDieunel Marc
(74) *Attorney, Agent, or Firm* — Thompson Coburn LLP

(57) ABSTRACT

Improved apparatus and methods, via an internet website, developed for the efficient implementation of workers' compensation cost containment practices for multi-unit employers, more particularly relating to indemnity (lost wages) and medical costs of workers' compensation claims in each unit. The methods analyze information about the user's current workers' compensation injury handling best practices and provide quantified results, customized recommendations and tools to reduce costs and improve best practices quality control.

14 Claims, 15 Drawing Sheets

APPARATUS AND METHOD OF WORKERS' COMPENSATION COST MANAGEMENT AND QUALITY CONTROL

CROSS-REFERENCE TO RELATED APPLICATION

The present application is a continuation-in-part of U.S. patent application Ser. No. 11/839,483 filed Aug. 15, 2007, now U.S. Pat. No. 7,856,367 which in turn claims priority from U.S. Provisional Patent Application No. 60/837,586 filed Aug. 15, 2006.

STATEMENT REGARDING FEDERALLY FUNDED OR SPONSORED RESEARCH OR DEVELOPMENT

Not applicable.

BACKGROUND OF THE INVENTION

1. Field of the Invention

Each year multi-unit, division or subsidiary companies, corporations, partnerships, trusts, governments, employers, and other employer entities (hereinafter, 'company or companies') that utilize workers' compensation insurance to cover injuries to employees pay millions of dollars in avoidable Workers' Compensation costs and lost employee productivity due to lack of information, lack of standardized processes to analyze and manage the losses, absence of transitional duty programs to return workers to productive positions, unrecognized fraudulent claims, the amount of time required to implement and train company staff to manage the myriad elements of a successful cost reduction program for multiple units frequently in diverse locations. Generally, Workers' Compensation costs for companies with multiple units can be reduced by 20%-50% with the implementation of an efficient and effective multi-unit Workers' Compensation Management Program. Yet most companies do not have the knowledge and resources in-house to do so, and hiring consultants to review and train staff is very expensive.

The methods of the present invention provides an online centralized source to implement, analyze and manage a workers' compensation management program by a company across multiple company units. In addition, the methods provide scalability of resources thus enabling management to implement a customized program across multiple company units by utilizing the benchmarking and assessment methods of the present invention through the online centralized source.

A computer based online Workers' Compensation Management and Quality Control cost containment system for an employer with multiple company units is provided in the present invention and implemented in a preferred embodiment on the world wide web at workerscompkit.com. This improved method provides users, such as employers, self-insured companies, and third party claims administrators (TPA), the necessary tools to self-implement and manage a workers' compensation cost containment program, or have a third party (TPA) manage the program, as is common in the industry for an employer with multiple company units.

An advantage of the present invention for a company with a multi-unit workers' compensation program is that an off-site company risk manager can use the centralized web enabled methods of the present invention to monitor and manage adherence to company guidelines, which thus provides remote but real time quality control over multiple units simultaneously by the company management that was never before possible.

To ensure successful implementation, the website provides a centralized location for all users to access the company workers' compensation program background information, assessment tools, data benchmarks, customized recommendations, step-by-step improvement plans, and any other improved program functionality.

The improved assessment methods of the present invention provide for each unit of a company with multiple units, a plurality of company units, or the company as a whole, (1) a National Workers' Compensation Management Score®, (2) a National Workers' Compensation Management Score Tracker™, (3) Customized Recommendations for Improvement by Module for Multi-site Companies, (4) a Prioritized Action Plan, (5) individual unit National Workers' Compensation Management Score® Ranking, Best-to-Worst and Worst-to-Best, for individual units and (6) collectively for the company an Average National Workers' Compensation Management Score®; (7) a Best Practice Profile Ranking Report, (8) a Best Practices Gap Analysis, and (9) include the necessary training tools for the user.

The improved data benchmarking methods of the present invention provide for each unit of a company with multiple units, a plurality of company units, or the company as a whole, (1) comparisons of one or more units, or the company as a whole, to one or more industry groups, (2) comparisons of one or more units, or the company as a whole, to one or more states or government entities for which statistics are available, (3) a Return To Work Ratio Report, (4) a Return to Work Tracker, (5) a Transitional Duty Cost Calculator, and an (6) Impact to Business, or Gross Sales to Pay for Workers' Compensation Costs Calculator, and (7) include the necessary training tools for the user.

Thus the improvements to the comprehensive online website provide company management with methods of the present invention for analysis and quality control of the employer's operational best practices from inception through implementation and training simultaneously across multiple company units.

2. Description of Related Art

Various attempts have been made to develop ways to deliver workers' compensation management services. A common method still in extensive use is to have a consultant travel to the employer and spend many days observing employment and management worksite practices, taking and recording notes, and then returning to their office to compile those notes into a massive report. The report would then go back and forth for revisions until the assessment report was perfect. This process would take approximately nine to twelve months just to get to implementation of any recommendations with the project often stalling at the assessment phase with the threat of actual implementation being weakened because the project had lost momentum, run out of money, or business decisions changed the focus because so much time had elapsed. Too much time was spent on assessment taking the focus off the real purpose which was to identify strengths and weaknesses in the program and build an action plan to create a strong workers' compensation management program. Instead, the focus was on providing the client with a perfect report within a limited budget.

Co-pending U.S. patent application Ser. No. 11/839,483, filed Aug. 15, 2007, and published Feb. 21, 2008 as Pub. No. 2008/0046297, disclosed methods of workers' compensation program management and quality control by providing single source, up-to-date comparative standards and statistics integrated into a workers' compensation program management system that is self-implemented via a proprietary network computer user interface application accessible from any network enabled workstation. In one embodiment, the method of '483 comprises (a) using the memory of a computer to store data about a specific unit's workers' compensation practices, (b) then using a resident computer program to analyze the data to produce improvement recommendations for that specific unit, (c) have that unit implement the recommendations, and (d) repeat the first three steps as needed. That method overcame the limitations of the related art in that the necessary data needed to manage a single unit workers' compensation program, identify problems and formulate solutions, was centrally controlled and accessible at one source via a network connection.

While the method of '483 is successful in reducing workers' compensation costs for an individual unit, it did not address the needs of companies with more than one unit or location with the improvements disclosed herein. The improvements of the present invention to the methods as described herein enable multi-site companies to compare and monitor program compliance across a plurality of units simultaneously from one central application. For example, by the method of the present invention a franchisor with fifty franchisees can have all fifty franchisees participate in individual assessment analyses and data benchmarking. The franchisor would receive reports and capabilities by the improved benchmarking and assessment methods of the present invention (1) for each franchisee, (2) a plurality or specific group of franchisees, such as those in a specific geographical location, (3) or the entire franchisee group or company as a whole.

A system for optimizing a workers' compensation claims management process was disclosed in Colburn et al., U.S.P. A.P. 2001/0044735. The invention related generally to an insurance auditing and monitoring system, and more particularly to a system for auditing and monitoring workers' compensation claims. Colburn disclosed a two-tiered method of third party auditing of workers' compensation claims management procedures by adjusters. It is, very simply, a claims auditing system of adjuster performance by a third party. Colburn monitors open claims making sure the claims adjusters are following aggressive claims management techniques—on a per claim basis and a per adjuster basis. By comparison, the methods of the present invention are implemented by the management of the company whereas in Colburn the method is implemented by adjusters. The method of the present invention assesses a plurality of operating practices of the organization by means of an intake questionnaire. The methods of the present invention do not evaluate individual claims like Colburn. (emphasis added)

An automated method for monitoring individual workers' compensation claims was disclosed in Skedsvold, USPAP 2008/0154672. The system documented a plurality of predetermined event flows of a claim which defined the events necessary in the workers' compensation process. Each event then identified a participant in the process which would have to act to complete the event. The event also identified the required data, or approval, required to complete the event, and to be supplied by the participant. The system monitored, displayed, and stored the status of each event within the workers' compensation case and denoted the completion of the event. Thus, Skedsvold disclosed only a large diary tickler system for individual claims management based upon Georgia time frames. There is absolutely no suggestion in Skedsvold of the methods of the present invention for workers' compensation management practices of a company.

The software application described at www.comperaser.com is a claims management software application focusing on pre-loss (safety) training and claims management. In comparison to the methods of the present invention it does not contain the Best Practice Assessment, the National Workers' Compensation Management Score® or Score Tracker, the Customized Recommendations for Improvement, or Recommendations for Improvement by Module.

Similarly, the referenced patent application Uninsured Cost Estimation System and Method, Pub. No. 2007/0021985, is limited to a processing system for measuring uninsured costs.

The Institute of Workers' Compensation Advisors, www.workcomp-professionals.com, trains and certifies professional insurance agents to help companies identify and fight overcharges caused by mistakes rampant in the complex and confusing Workers' Compensation system. It does not provide the methods of the present invention.

CompEraser.com and the Institute of WorkComp Advisors, LLC, P.O. Box 5437, Asheville, N.C. 28813, are trying to lower workers comp costs but these programs do not contain an automated, standardized assessment scoring system based on company best practices. Neither do they contain complete on-line training programs nor easy to use benchmarking systems of the present invention into which an employer can input data on multiple units and quickly develop an easy-to-read online quantitative report comparing the individual units to each other, or the company to national averages. Neither do they provide recommendations for improvement informing companies what changes that need to be made.

The data benchmarking and assessment methods of the present invention allow management to make quick, informed decisions based on the quantifiable indices produced by the methods. The methods allow a multi-site employer to assess workers' compensation performance in many locations simultaneously for review by management. Brokers, insurance companies and third party administrators may use the methods of the present invention to assess their multi-unit clients' best practices performance. This assessment can take place within a few minutes utilizing the methods of the present invention, compared to weeks and months using the standard method in the industry of hiring a consultant for on-site reviews and training, usually one site at a time.

An additional advantage of the method of the present invention is to educate the user about the various methods of workers' compensation cost containment and best practices across more than one company unit. The methodology is designed to be informative and may be completed with a group of representatives from more than one company unit to provoke discussion. The educational content requests company information on the numerous variables and thereby starts educating the user immediately with the first section of the Best Practice Assessment.

A further advantage of the method of the present invention is an automated injury management program that is employer driven. Because the assessment is web-based and completely automated this is a departure from the traditional and conventional method of the industry of assessing workers' compensation issues across multiple units of a company.

A further advantage of the methods of the present invention is that assessment results are numeric and quantifiable for each user, company unit, a plurality or group of company units, or the company as a whole.

A further advantage of the methods of the present invention is that the data benchmarking and assessment methods maintain measurements of analyzed data so that evaluations are uniform across multiple units. Thus a company having multiple units can assure that evaluations are consistent from unit to unit and can discern patterns, trends, variations, and other differences or similarities between units, groups or within the company as a whole.

A further advantage of the method of the present invention is that money for implementation of recommendations may be informatively allocated by management based upon the analyzed data. Thus the methods of the present invention may change the direction and apportionment of program costs for multiple units within a company. Instead of investing heavily in funding an expensive consultant mediated assessment and recommendation process for multiple company units, individual company units representatives complete these steps inexpensively online thereby saving money for the more critical portion of workers' compensation cost management, Implementation of Recommendations, which is where company resources should preferably be allocated to maximize program results.

A further advantage of the method of the present invention is that since participants tend to lose focus when a process is stretched over a long period of time, as with the current methods described in the prior art, shortening the process for multiple units by the method of the present invention sustains focus and intent to implementation. Shortened assessment recommendation time frames sustain user focus in implementation, and shortened time frames sustain project momentum onto and through completion.

A further advantage of the method of the present invention is that based on the National Workers' Compensation Management Score®, users in each unit can gauge how well or how poorly they are doing, and will quickly have an idea of their strengths and weaknesses. The Recommendations will provide the basis for an action plan for that specific company unit. Thus, before the end of a business day, users can have the nucleus of an implementation plan to use going forward.

A further advantage of the method of the present invention is that before the method of the present invention, only the largest companies could avail themselves of a workers' compensation management program because the program was paper based and consultants were needed to conduct the assessments and training. Whereas with the method of the present invention the methods of the program are employer driven. An employer representative, such as the company workers' compensation program manager, can direct individual units to participate in the assessment. From those unit assessments, the program manager may determine the effectiveness of the implementation of program recommendations and then determine where any additional improvements need to be made in each participating unit, across multiple company units, or the entire company.

A further advantage of the method of the present invention is that the methodology is quantifiable in individual company units, a plurality or group of units, or the company as a whole. Before, assessments could only be couched in terms of words. By the methods of the present invention users obtain a workers' compensation score that quantifies their performance in preferably the ten major key economic drivers that comprise workers' compensation costs. Quantifying assessment data has huge ramifications for discerning economic or geographical trends by management, or detecting trends in specific types of businesses i.e., manufacturing, service industries. Quantifying assessment data also enables users to forecast the depth and breadth of their individual unit injury management program. The higher the score, the smaller the implementation process required, the lower the score, the more implementation areas need to be activated.

A further advantage of the method of the present invention is the adaptability for multi divisional companies. The methods of the present invention provide uniformity in assessment simultaneously across multiple company units never before possible. In the past, assessing workers' compensation practices for multi-divisional companies was an almost Herculean task, and assessment alone could take years. And even then it would not present a complete picture as assessment criteria might differ between units, or owners might opt not to assess every facility due to the time and cost involved. The method of the present invention enables employers to have every division participate in the same assessment for a significantly lower cost than the prior on site methods in the art measuring the same criteria. Automation of the analysis provides results rapidly which provides a great advantage for management conducting a comprehensive assessment of global proportions, and doing so with relative ease. Thus the online system enables designated managers to view subordinate divisions and determine areas for improvement and make comparisons between units. The fact that every unit takes the same assessment and the answers are standardized ensures that the measurement is a universal comparative yardstick, or score, upon which the key cost drivers can be measured from unit to unit. Thus the score ensures that every participant is being measured on consistent rather than arbitrary criteria.

In yet another aspect of the invention, if a multiple unit company, has their own set of unique workers' compensation performance standards to be used in their assessments and benchmarking, the company representative may have a custom database compiled and made available via the methods of the present invention. Each internet application web menu may be created and customized specifically for a multiple unit company user. The user will then direct each of its representatives, as well as its independent contractors or consultants, to the one location on the internet where the program standards can be obtained and used to manage the program. The application provides an internet based set of tools and menus that advance and enhance the environment for the specific needs of the multiple unit company user and are instantly available to a representative with an internet connection.

This listing of the several advantages of the present invention is not intended to be all-inclusive and many other advantages will be made apparent by the following detailed description.

BRIEF SUMMARY OF THE INVENTION

The methods of the present invention overcome the limitations of the related art by shortening the length of time from assessment to implementation, standardizing assessment criteria for better data analysis, automating the assessment process for quicker turn-around from assessment to implementation by using a web based centralized program source that provides companies with multiple units an online immediate assessment to implement a standardized workers' compensation cost control program across multiple units.

Before the development of the methods of present invention, it was not possible to rapidly gather the information, develop recommendations, and provide education and tools to implement a workers' compensation cost containment program for a plurality of company units in a matter of minutes or hours, versus the prior art time frame of weeks to months.

The improved assessment methods of the present invention provide for each unit of a company with multiple units, a plurality of company units, or the company as a whole, (1) a National Workers' Compensation Management Score®, (2) a National Workers' Compensation Management Score Tracker™, (3) Customized Recommendations for Improvement by Module for Multi-site Companies, (4) a Prioritized Action Plan, (5) individual unit National Workers' Compensation Score® Ranking, Best-to-Worst and Worst-to-Best, for individual units and (6) collectively for the company an Average National Workers' Compensation Management Score®; (7) a Best Practice Profile Ranking Report, (8) a Best Practices Gap Analysis, and (9) include the necessary training tools for the user.

The improved data benchmarking methods of the present invention provide for each unit of a company with multiple units, a plurality of company units, or the company as a whole, (1) comparisons of one or more units, or the company as a whole, to one or more industry groups, (2) comparisons of one or more units, or the company as a whole, to one or more states or government entities for which statistics are available, (3) a Return To Work Ratio Report, (4) a Return to Work Tracker, (5) a Transitional Duty Cost Calculator, and an (6) Impact to Business, or Gross Sales to Pay for Workers' Compensation Costs Calculator, and (7) include the necessary training tools for the user.

In the prior art when an assessment was written it took much longer, and did not gather consistent information because it was done by widely dispersed consulting staff, and the questions and response options were not uniform. Because many companies have multiple locations, it has become increasingly difficult for the workers' compensation program administrators, risk managers, to maintain quality control by determining and guaranteeing that developed standards are followed and changes implemented. The methods of the present invention provide a centralized data repository with analytical tools that may be applied to a plurality of company units individually and in groups as desired by management.

In addition, the method of the present invention provides online the training initiatives necessary for successful implementation by a company across multiple units. While all aspects of a cost containment program are important, without the correct training tools it is difficult to effectively reduce workers' compensation costs. The online resources offer a plurality of tools to ensure successful training, such as presentations, sample scripts, exercises, demonstrations, and handouts which can be customized for each user, company unit, or the company units in aggregate.

Assessment of Best Practices

The method of the present invention substantially departs from the conventional concepts of the related art by providing automated assessment and program recommendations across multiple company units, which substantially shortens the program assessment, development and implementation life cycles. The results are immediately quantifiable across all units which has positive ramifications for conducting data analysis and reporting results on any number of measurement schema (inter/intra-national, multi-divisional, industry type, governmental, geographic region, etc.). It is how the assessment is conducted and the recommendations generated for each user, unit, or the company as a whole that is a significant departure from the prior art.

A system and methods are disclosed, via a computer based website, for assessing the status, efficient implementation and management of workers' compensation practices in a company with multiple units relating to reducing indemnity (lost wages), medical costs of workers' compensation claims, the overall expense of the program, and assessing staff practices to maintain quality control of the program.

A preferred embodiment of the present invention analyzes a plurality of elements comprising a successful workers' compensation management program including but not limited to information about the user's current workers' compensation injury handling practices, including return to work at full-duty and transitional duty programs, communications with employees and physicians, steps taken to reduce fraud, increase management involvement and commitment, and many other elements, to provide recommendations for improvement, statistical benchmarks, program efficiency scores, and training.

In a preferred embodiment of the assessment method, the user responds to a series of questions which are analyzed in real time by the proprietary computer based application of the present invention. The assessment method aggregates the results in a plurality of reports or indices for multiple unit companies, comprising management practice analyses such as the (1) National Workers' Compensation Management Score® for each unit, (2) a National Workers' Compensation Management Score Tracker®, (3) Customized Recommendations for Improvement by Module for Multi-site Companies, (4) a Prioritized Action Plan, (5) individual unit National Workers' Compensation Management Score® Ranking, Best-to-Worst and Worst-to-Best, for individual unit and company comparison with the (6) Average Company National Workers' Compensation Management Score®; (7) a Best Practice Profile Report, (8) a Best Practices Gap Analysis, and include the necessary training tools for the user.

National Workers' Compensation Management Score®

A further advantage of the method of the present invention is calculation of a National Workers' Compensation Management Score®. The score may be calculated for the individual organizational units, a plurality of units, or the company as a whole. Upon answering the questions in the assessment, the answers are given a numeric value and the values are totaled to provide the score. In addition, a company average National Workers' Compensation Management Score® may be derived from the scores of a plurality of units, where the sum of the scores of all participating units is divided by the number of participating units. Once the National Workers' Compensation Management Score® is calculated by a participant for a unit, a plurality of units, or the company as a whole, the resulting score may be ranked against one or a plurality of participants having previously taken the Assessment.

National Workers' Compensation Management Score Tracker™

The National Workers' Compensation Management Score Tracker™ measures changes in the National Workers' Compensation Management Score® over time—whether it goes up or down. In a preferred embodiment, the Tracker illustrates the changes in a table or bar graph where the Y axis represents the National Workers' Compensation Management Score® values and the X axis represents elapsed program time, such as weeks, months or years. By continuously plotting scores over time, the Tracker monitors ongoing progress in meeting performance goals and measures how well programs are being integrated into company culture. Showing improvement is an important motivational factor that drives management commitment and leverages resources for making additional improvements. Improvement can be tracked by unit, division or throughout company operations. Preferably, every time a unit retakes the Best Practice Assessment, the National Workers' Compensation Management Score® changes from the prior entry, and the change is automatically plotted on a line graph, or other indicating medium. Thus the effectiveness of implementing recommended workers' compensation cost control practices of the present invention may be tracked over time for individual units, a plurality of units, or the company as a whole. The Tracker provides management with a prompt analytical result, a visual and illustrative indicator, and therefore a powerful tool for controlling cost.

Customized Recommendations for Improvement by Module for a Multi-Site Company

The Customized Recommendations for Improvement (CRI) are output from responses to the questions in the assessment and are sorted, scaled or otherwise visually ranked using color coded modules. For example, the modules are coded by greatest need for improvement first, then progressing through sequentially lesser needs for improvement by individual module. This assessment provides an automated calculation of a needs assessment across multiple company units that was not available in the prior art.

Co-pending application Ser. No. '483 provided in FIG. 2 within process #212, assessment of company workers' compensation management practices, the customized recommendations for improvement (CRI) #228 as a subsequent step between the assessment analysis #220 and the benchmark analysis #232. In '483 the CRI were presented in a long list sorted by module for a single unit. The method of the present invention improves upon the CRI method described in the '483 application by color coding and ranking modules in a table for a plurality of units.

In the method of present invention, the CRI are sorted into modules and directly linked to the improvement plan for that specific unit thus enabling the participant to compare the performance of that unit to other ranked units, and then proceed directly to training to address deficiencies. With each recommendation a link enables the participant to proceed immediately to educational material in the Improvement Plan to implement the suggested Best Practices. Preferably, recommendations for multiple units are color-coded in a table according to their placement in the ranking. An example of ranking in the method of the present invention comprises assigning recommendations to modules denoted as Critical, Needs Improvement and Good. In a preferred embodiment the highest percentage of recommendations generated by the assessment that need to be implemented would be identified as "Critical (coded red)," the next tier as "Needs Improvement (coded yellow)", and the modules with the fewest recommendations marked as "Good (coded green)."

Thus by the method of the present invention the CRI are immediately ranked by module according to which is the most critical module that needs improvement. This data and visual ranking provides an immediate automated way to do a needs assessment for a company across multiple units, which is an improvement over the methods of the prior art which did not provide such ranking for multi-unit companies. Recommendations for Improvement are compiled from all business units taking the assessment and receiving their suggested best practices which enables a very large company to do a complete assessment of all business units in a time period much reduced over the prior art. All business units will receive their individual scores and Recommendations for Improvement, and the corporation as a whole may receive a score averaged over a plurality of units, and/or a score averaged over the entire company. Finally, progress of all units or divisions of a company can be centrally monitored.

Once the Customized Recommendations for Improvement are provided for each unit and the company, the methods of the present invention enable the user to progress through a step-by-step improvement plan that includes everything from setting performance goals to managing medical care coordination, cost containment, and finally, training users and supervisors at each company unit. The method provides users with the necessary educational information, and also the tools to use that knowledge to implement a successful workers' compensation cost containment program for each unit and the company as a whole. The goals of this system are not only to reduce costs, but also to strengthen relationships between companies and their employees and return them to the substantial gainful activity of work and employment.

The method of the present invention provides the tools necessary to implement the recommendations suggested, including sample documents, forms, presentations, scripts, and the suggested training tools.

Customized Recommendations for Improvement Prioritized Action Plan for Multi-Site Companies Recommendations for Improvement are provided for multi-site or location employers. As work progresses on implementing the changes in the Customized Recommendations for Improvement, the Action Plan Timetable tracks results and status for each item. For example, a large multi-division company with fourteen division managers performed the online assessment which took approximately one hour. Three other divisions were reviewed in-house by consultants which review took six months for same level of assessment.

Best Practice Profile Ranking Report

The Best Practice Profile Ranking, also known as the Best Practice Profile Ranking report, is an assessment of the effectiveness of implementation of company Best Practices. Company 'best practices' as used herein means practices and processes within the industry generally known to reduce costs, but may also include practices customized to achieve cost reductions for one or more units. Preferably, the Best Practice Profile Ranking is an analysis of the understanding by users of the current best practices in place at all operating units of the company. The Best Practice Profile Ranking is derived from questions answered by a user during an assessment which generates the report indicating a percentage of correct answers. The percentage result is then an indicator of the ranking that user or unit in comparison to other users or units. In one embodiment, the lower the rank the more improvement is required. The Best Practices Profile Ranking pinpoints problem areas for multi-location or multi-division companies by identifying problems in current practices in each participating division, and the percentage that have those practices in place at the entire company. It is a company-wide needs assessment and shows management the biggest areas of opportunity for cost improvement by compiling results of all recommendations in one report. From the report, additional training objectives may be designed to address areas for further improvement. Based on percentages, the user may initiate discussion of recommendation implementation strategies and identify issues for prioritization to put on a timetable in an Action Plan. Training objectives may also be set with this profile. Brokers can assess industry groups, such as airlines, food service, etc. Self-insurance organizations, associations, insurance carriers, captives and reinsurers can use the method to assess an entire membership.

Best Practices Gap Analysis

The Best Practices Gap Analysis determines the deficiencies, what is lacking or missing, or failure of implementation of the recommended best practices. The Best Practices Gap Analysis compiles the results from all the participating divisions or operating units and shows the effectiveness of the implementation of the customized recommendations, by the highest percentage down to the lowest percentage of effectiveness for each unit or division—from one hundred percent failure all the way to zero. At zero all units or divisions will have achieved that recommended best practice. Thus the analysis shows the gap between effective implementation of recommended best practices with a result calculated at or near zero, up to an almost complete failure of implementation of the recommendations resulting in a score at or near one hundred percent. Therefore, from a training perspective the training program may be customized to address the highest failures first, and so on in descending order. After additional training, as gradually more and more participants have implemented the recommended best practices, fewer and fewer participants will have failed them, so the failure rate, or gap, should decline as the recommended cost control procedures derived by the methods of the present invention are implemented. Thus the calculated result preferably shows the widest gaps between current practices and best practices.

National Workers' Compensation Management Score® Ranking—Best-to-Worst and Worst-to-Best The method of the present invention comprises the ability to rank divisions or units within multi-division or multi-unit companies based upon the National Workers' Compensation Management Score® of each company division or unit. Utilizing the method of the present invention, management is able to compare the effectiveness of implemented workers' compensation cost control practices between two units or among a plurality of units. Preferably, the method provides a visualized National Workers' Compensation Management Score® ranking of divisions in a table from Best-to-Worst, or from Worst-to-Best. In Best-to-Worst ranking, any unit with a higher score is placed above any unit with a lower score in the table or list thus producing the ranking of units. Inverting the values produces the converse table or list, Worst-to-Best. These rankings can then be compared to the National Workers' Compensation Management Score® to identify divisions that are performing above the corporate average and those performing below the corporate average. For those divisions below the company or industry average National Workers' Compensation Management Score®, or in the 'worst' category, the ranking provides a powerful incentive for division management to make additional effort to improve workers' compensation cost control practices. Upon repeating the Assessment cycle of the present invention and implementing additional recommended cost control improvements, the repeating unit strives to rank in the "Best" category by obtaining and maintaining a higher National Workers' Compensation Management Score®.

Data Benchmarking

Improvements in data benchmarking in the method of the present invention comprise (1) comparisons to a plurality of industry groups, (2) comparisons to one or more states or other governmental units (3) a Return To Work Ratio Report, (4) a Return to Work Tracker, (5) a Transitional Duty Cost Calculator, and an (6) Impact to Business, or Gross Sales to Pay for Workers' Compensation Costs Calculator. Loss data and corporate data from a plurality of company units is input by users to determine how the company compares to peer, state and national statistics, commonly referred to in the trade, and herein, as data benchmarks, or simply benchmarks.

Benchmark Comparisons—by Industry Groups or Government Units

A further advantage of the method of the present invention is the utilization of industry group benchmarks from a plurality of industry groups providing direct industry-to-industry comparison of the effectiveness of workers' compensation management implementation of the cost control practices. The method provides a plurality of reports from automated calculations and comparisons with data from similar companies, which calculation was not previously available in the prior art or in co-pending application Ser. No. '483. Preferably, data benchmarking reports are derived from user input of unit claims loss data and unit financial data, which is then compared to a compilation of national averages and statistics from a variety of publicly available sources, and the results are expressed as numbers, percentages, rates or other comparative functions. For example, the user may now compare their data with data from other company units, a plurality of industry groups, their own industry group, a state-by-state comparison, or other comparative groupings, by selecting a relevant Standard Industrial Classification (SIC) codes, geographical locations, or other acceptable identifiers. Thus the participant may self-select industry groups and produce an automated benchmarking survey. This automated self-help functionality for comparison to industry groups or governmental units was not previously available in the prior art and would have required hiring a consultant trained in such data benchmarking to research the comparative industrial group or governmental statistics, perform the analysis and generate the reports.

Return-to-Work Ratio

Dates of employee injuries and dates of return to work are input to measure the efficiency of the companies return to work program. Preferably, the Return to Work Ratio is expressed as a ratio of X to Y where X is the number of days that it takes for an employee to return to work, and Y is the number of employees. The goal is to return as many workers as possible to work in a s short a time as possible. The Return to Work Ratio of the method of the present invention provides data on how many injured employees are returning to work within an optimal time frame. If an optimal time frame is one week, then the ratio will monitor how many employees are turning to work within the optimal time frame of one week. This is a valuable tool for tracking the progress of the implementation of one or more recommendations. The user inputs the Return to Work employee data and the ratio is calculated. Preferably, the Return to Work Ratio is displayed in a bar graph or other comparison, and progress may be monitored by management over time.

Return-to-Work Tracker

The Return to Work Tracker indicates whether there is a higher or lower percentage of injured employees returning to work over a selected period of time, for example, month after month, and shows what the RTW Ratio will be if improvement is not made to return employees to work more quickly. Preferably, monthly progress is plotted on a line graph or other comparison with the ability to show improvement over time. Preferably, the Return to Work Tracker is expressed as a line graph where X is represented as a consecutive period of time, i.e., months over which the data is compiled for the employee return-to-work time frame, and Y is the calculated Return-to-Work ratio. Thus the newly calculated ratio for each period of time is sequentially plotted. The goal is to have the slope of the line increase over time indicating the return to work of as many workers as possible in as short a time as possible.

Gross Sales to Pay for Workers' Compensation Costs Calculator

A Gross Sales Calculator, or Gross Sales to Pay for Workers' Compensation Costs Calculator, shows what the company has to earn to replace the losses from workers' compensation expenses. Generally, the actual cost is much larger than what executives are provided on a loss report. Data input for the analysis comprises employer loss costs, individually or in the aggregate, total incurred costs, and company profit margin. Once management knows their profit margin, or the industry profit margin, the method calculates the amount of gross sales required to cover the company workers' compensation costs.

Transitional Duty Cost Calculator

The Transitional Duty Cost Calculator is a calculation by the employer of the cost savings by returning an employee, or multiple employees, back to work. Preferably, the average cost savings is calculated by entering data including the estimated number of days saved, the estimated average indemnity cost per day, the cost of replacement labor and the company profit margin to calculate the total estimated savings of bringing an employee or multiple employees back to work on transitional duty (light duty). The result states the amount of gross sales the company must generate to replace costs lost by workers' compensation expenditures. For example, the method can be used to determine how much excess the company will spend if they keep the employee out longer than necessary, or how much they will save if they return the employee to work in a shorter time period. Thus is useful because companies often do not want to return employees to work until they are 100% productive. This feature enables employers to analyze the cost-benefit of bringing employees back to work at partial productivity (light duty) or returning them to work only when 100% productive.

In addition, the method of the present invention provides the educational content of the improvement plan modules and the tools are available to implement them on-line. Thus it enables a large multi-site employer to institute a consistent cost containment program across multiple units within a few days or weeks, rather than months.

BRIEF DESCRIPTION OF THE DRAWINGS

FIG. 9 is a screenshot of a computer user interface showing an embodiment of the Best Practice Profile Report of the present invention.

FIG. 10 is a screenshot of a computer user interface showing an embodiment of the Best Practice Gap Analysis of the present invention.

DETAILED DESCRIPTION OF THE INVENTION

The present invention is described more fully by reference to the preferred embodiments of the figures. However, the embodiments of the invention may be in different forms and these drawings should not be construed as limiting the scope of the invention as described herein. FIGS. 1 through 15 are illustrious of embodiments of the present invention and are in accord therewith.

The methods of the present invention substantially depart from the prior art methods of workers' compensation program management by providing single source, up-to-date comparative standards and statistics relevant to multi-unit companies integrated into a complete workers' compensation program management system that is self-implemented via a proprietary network computer user interface application accessible from any network enabled workstation.

In a preferred embodiment of the present invention, applicable employer and employee data are input and converted into an accessible digital form, stored, analyzed and compiled according to a plurality of specific parameters, displayed on the dashboard and/or printed to inform the user and to provide actionable recommendations for program changes and improvements. The method of the present invention overcomes the limitations of the related art in that the necessary data needed to manage a workers' compensation program across multiple units and locations, identify problems and formulate solutions is centrally controlled and accessible at one source via a network connection and may be automatically updated through command functions of the network application of the invention.

In a preferred embodiment, the method of the present invention is initiated by navigating to an internet accessible website universal resource locator (URL), www.WorkersCompKit.com, which retrieves an introductory proprietary webpage located on a remote network server or other computer. Information on workers' compensation cost control is provided on the introductory page, and authorized users may proceed on to the dashboard, or user interface, that comprises the links to the various process of the present invention. The dashboard is a webpage specific to that authorized user and can be accessed at anytime. The dashboard acts as a way for the management to monitor progress throughout the implementation of the program across multiple units in diverse locations. Each step is indicated on the dashboard. Once a step (or part of a step) has been completed it is indicated with a symbol on the dashboard, preferably a checkmark. The user can then easily see, at a glance, what steps have been completed. In addition, all documents that have been viewed or printed are listed under their related topic. This provides an easy-to-use document finder and central program data repository.

Figure 1:
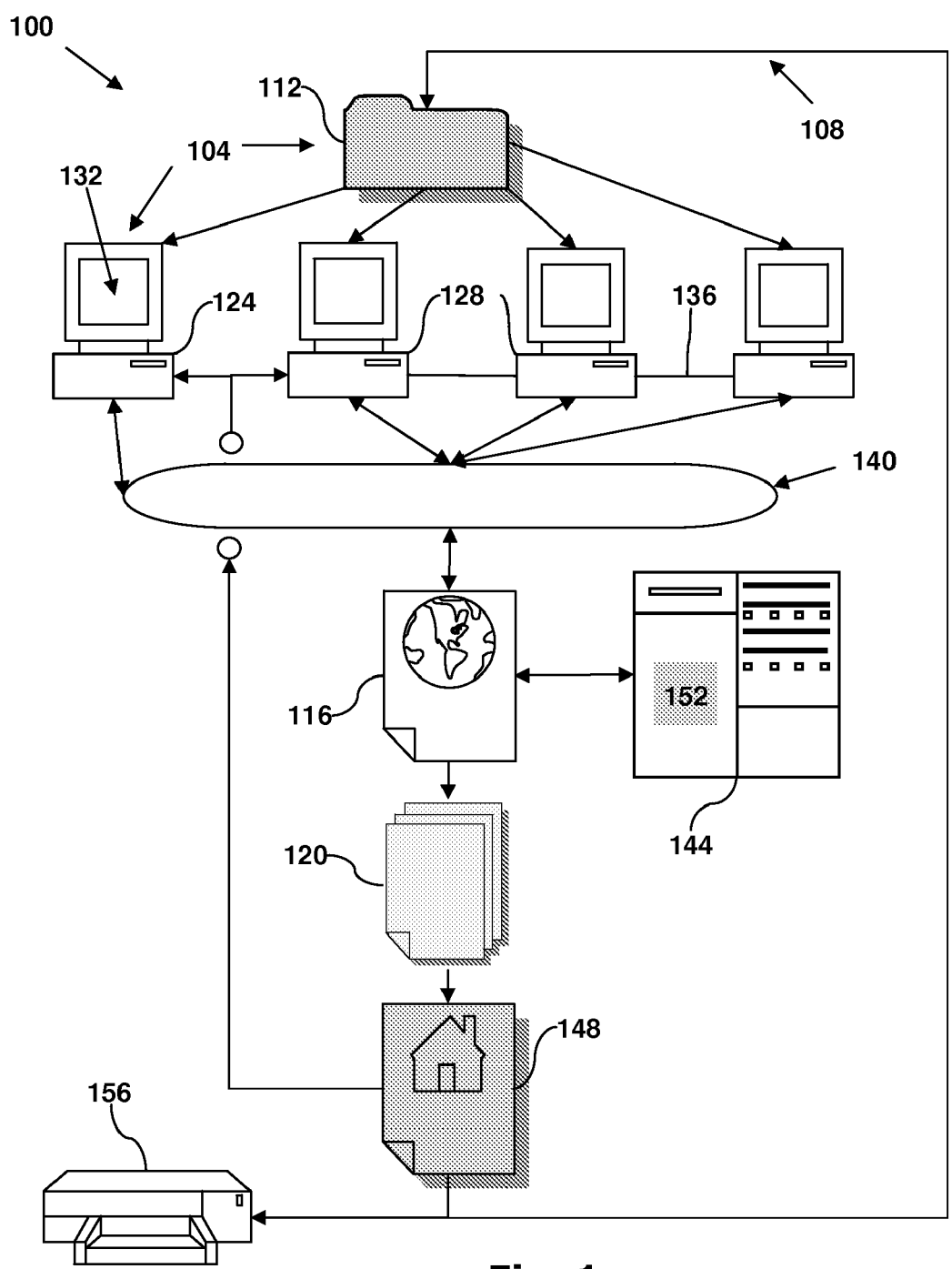
FIG. 1 is a schematic diagram of an exemplary environment in which the method of the invention analyzes and displays workers' compensation cost variables that affect cost reduction management and quality control.

FIG. 1. Referring now to the method of the present invention, FIG. 1 is a schematic diagram of an exemplary environment in which the method of a preferred embodiment of the invention 100 may be used to input, process, analyze, quantify, store, retrieve and display the compiled workers' compensation program data 152 for a plurality of company units.

A workers' compensation cost analysis and management cycle 108 of the present invention is initiated by a user 104 logging onto a computer workstation 124, or a plurality of intranet connected computer workstations 128 for a plurality of users 104, running network accessing software 132. Through the network access software 132, by utilizing an optional username and password if required by the workers' compensation program administrator, the user 104 accesses a proprietary workers' compensation data entry and analysis software application 116, hereinafter known as the 'portal', resident on a remote server or other computer 144. If a user is not authorized they have the ability to view certain general information 204 about the proprietary Workers' Compensation Management and Quality Control methods.

The user 104 then accesses a proprietary webpage on the portal 116, known as the 'dashboard' 120, to enter data from existing workers' compensation injury claims from a plurality of company units, results from program management improvements and changes, program expenses, and any other relevant claim or program information 112. The dashboard 120 webpage provides access to a plurality of subordinate proprietary web pages specialized for a variety of data and management functions including, but not limited to, data input, analysis, reporting, production of recommendations, user training, etc. The computer workstations 124 and 128 may be interconnected via an intranet 136 or otherwise connected to a network 140, such as the internet, to access the portal 116 and dashboard 120 resident on the remote server 144. Upon input of the relevant data 112 through the dashboard 120, an analysis 148 by the portal application 116 compiled on the remote server 144 is provided to the user 104 directly on the workstation, 124 and/or 128. A printer 156 may also be utilized to display and distribute analyses 148, or any other printable materials from the portal 116 website in hard copy format.

The input and analyzed data 152 is stored on the remote server 144 for access by an authorized user 104 from any workstation 124 and/or 128 without the requirement of any proprietary software being resident on the workstations 124 and/or 128. The data 152 may be extracted, compiled for various analyses, and the results of the analyses presented on the dashboard 120 in support of a plurality of purposes, including but not limited to assessment of workers' compensation claim management practices across multiple units or the company as a whole, data benchmarking of economics of the workers' compensation program, return to work data, production of program improvement recommendations, implementation of program management quality controls, training of users and managers, identification of user activity, etc.

To complete a workers' compensation cost analysis and management cycle 108 for companies with multiple units or divisions, in the same or different locations, data derived from the implementation of improvements and recommendations 148 is input 112 at the beginning of the cycle 108 which generates a new analysis 148 from the new data compilation 152, showing changes, if any, in program parameters from the prior cycle 108. Time requirements, costs, amounts and rates of change in program parameters are a few of a plurality of variables used to monitor the quality and efficacy of program costs and operations. In addition, any new data, such as new injury claims 112, is also input at the beginning of the cycle 108 and the data is analyzed as before, generating a new analysis 148 and stored data compilation 152. Thus the cycle 108 may be repeated a plurality of times in furtherance of the goals of the program.

Figure 2:
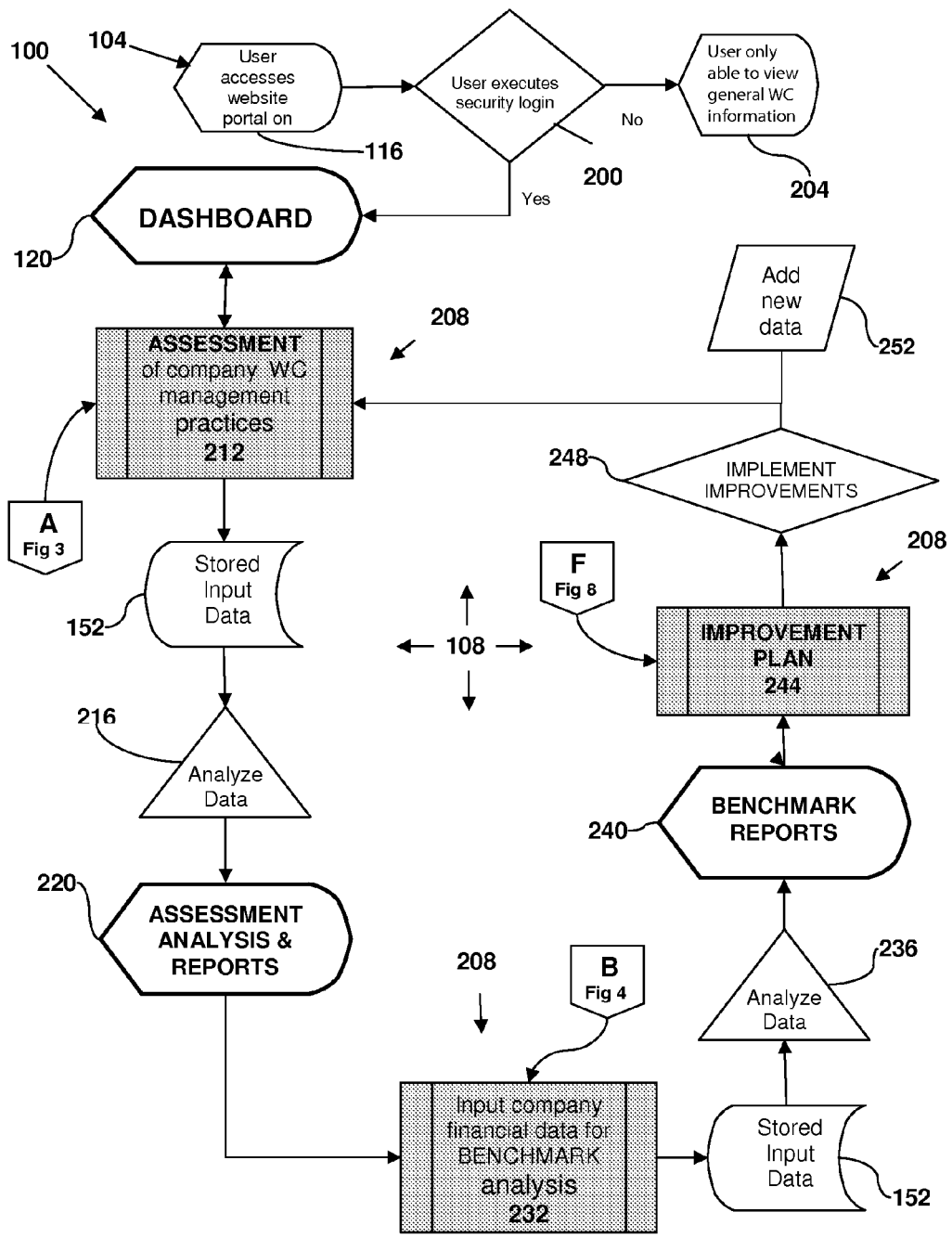
FIG. 2 is a flow diagram illustrating an embodiment of the method of the invention.

FIG. 2. Referring now to the method of the present invention, FIG. 2 is a flow diagram of a preferred embodiment of the method of the present invention 100 illustrating the various data input and analysis steps in the workers' compensation cost analysis and management cycle 108 for companies with multiple units or divisions, in the same or different locations. The analysis is initiated by a user 104 utilizing network access software 132 on a workstation 124, or 128, to locate the URL of the portal of the present invention 116 via a network 136 or 140. Upon entry through a login page 200 on the portal 116, the computer displays the dashboard 120 of the present invention. If the user 104 is not authorized to proceed to the dashboard 120 then they are directed to one or more general information web pages 204 and the user may not proceed with analysis of their program by the method 100. The dashboard 120 comprises a plurality of processes 208, or levels, that additionally comprise the workers' compensation management and quality control system and method 100 of the present invention. The dashboard 120 directs the user 104 to input workers' compensation program data 112 in response to programmed queries.

It is important to initially assess the strengths and weaknesses of the user's company in terms of workers' compensation program management, injury prevention and remediation, and return to work efforts. To do so, various elements are utilized in the assessment process 212 including answering a detailed proprietary questionnaire 256 available through the dashboard 120. An optional element of the assessment 212 is to have a Medical Advisor (board-certified MD) and a Senior Claims Consultant review 260 a plurality of files in person, preferably 20-30 files in several of the user's claim offices, to determine how well their claims are being handled, and then incorporate this data into the assessment 212. The system 100 then analyses the input and produces a plurality of reports 220.

The first process 208 of the method of the present invention 100 is an assessment of program claim and management practices 212 from plurality of units. The input data 112 is subjected to analysis 216 and presented to the user in a plurality of report formats 220. Input data 112, and any assessment analyses and reports 220, are centrally stored 152 on the remote server or other computer 144 for later retrieval as desired by a user 104.

The next process in the cycle 208 is analysis of the economics of the workers' compensation program. Costs and expenses 112 are input for analysis by the benchmark process 232. The input financial data 112 is subjected to analysis 236 and presented to the user in a plurality of report formats 240. The benchmark analysis 236 and reports 240 include, but are not limited to, comparisons with national averages and statistics relevant to program management and quality control, and graphs of program variables. The benchmark reports 240 are utilized to determine strengths and weaknesses in program management and expense, and to provide a benchmark 232 for the next process in the cycle 108. Input data 112, and any benchmark analyses and reports 240, are centrally stored 152 on the remote server or other computer 144 for later retrieval as desired by a user 104.

The next process 208 in the cycle 108, enables the workers' compensation program manager to utilize the online staff improvement training tools to upgrade staff skills with the goal of obtaining a new program Improvement Plan 244 derived from the online assessment 212 and benchmark 232 processes. The Improvement Plan 244 preferably comprises a plurality of training exercises, or modules 404-440, specific for certain types of specialized tasks in operation of a workers' compensation management program. Preferably the modules 404-440 are used sequentially to build complete skill sets in the user. However, the flexibility of the method 100 enables users of any skill level, including advanced users, to utilize one or more of the modules 404-440 in any order desired. Proper utilization of the Improvement Plan 244 will identify potential program improvements 248. The workers' compensation program manager may then implement one or more of these improvements 248 as part of the program management and quality control. Preferably, to complete the cycle 108 the data 112 from the implemented program improvements 248 is input in the dashboard 120 and analyzed through the assessment 212 and benchmark 232 processes. The results may be compared to initial analyses to track program improvements over time, and to identify deficient areas where additional online training could be utilized. In addition, the method allows for continual input of new data 252 to be included for a new analysis.

Thus the method of the present invention provides a centralized online cyclical framework for workers' compensation program management and quality control. As stated above, preferably a new user to the method 100 would enter the cycle 108 at the assessment process 212 and proceed sequentially through the cycle as shown in FIG. 2. However, employers generally have established workers' compensation programs, as mandated by law in many jurisdictions, managed by staff with varying degrees of skill sets specific to managing a workers' compensation program. Thus, an employer may not have the need for their program management staff to expend the time or resources necessary to complete an entire management cycle 108. The flexibility of the method 100 enables a user to begin the cycle 108 at any process depending upon their needs and skill level. In addition, it provides the workers' compensation program manager with a centralized online analysis and training method 100 available at any time, without the need for hiring and scheduling a consultant to conduct expensive in-house training sessions. The program cost reduction by the method the present invention is preferably in the range of twenty to fifty percent.

Figure 3:
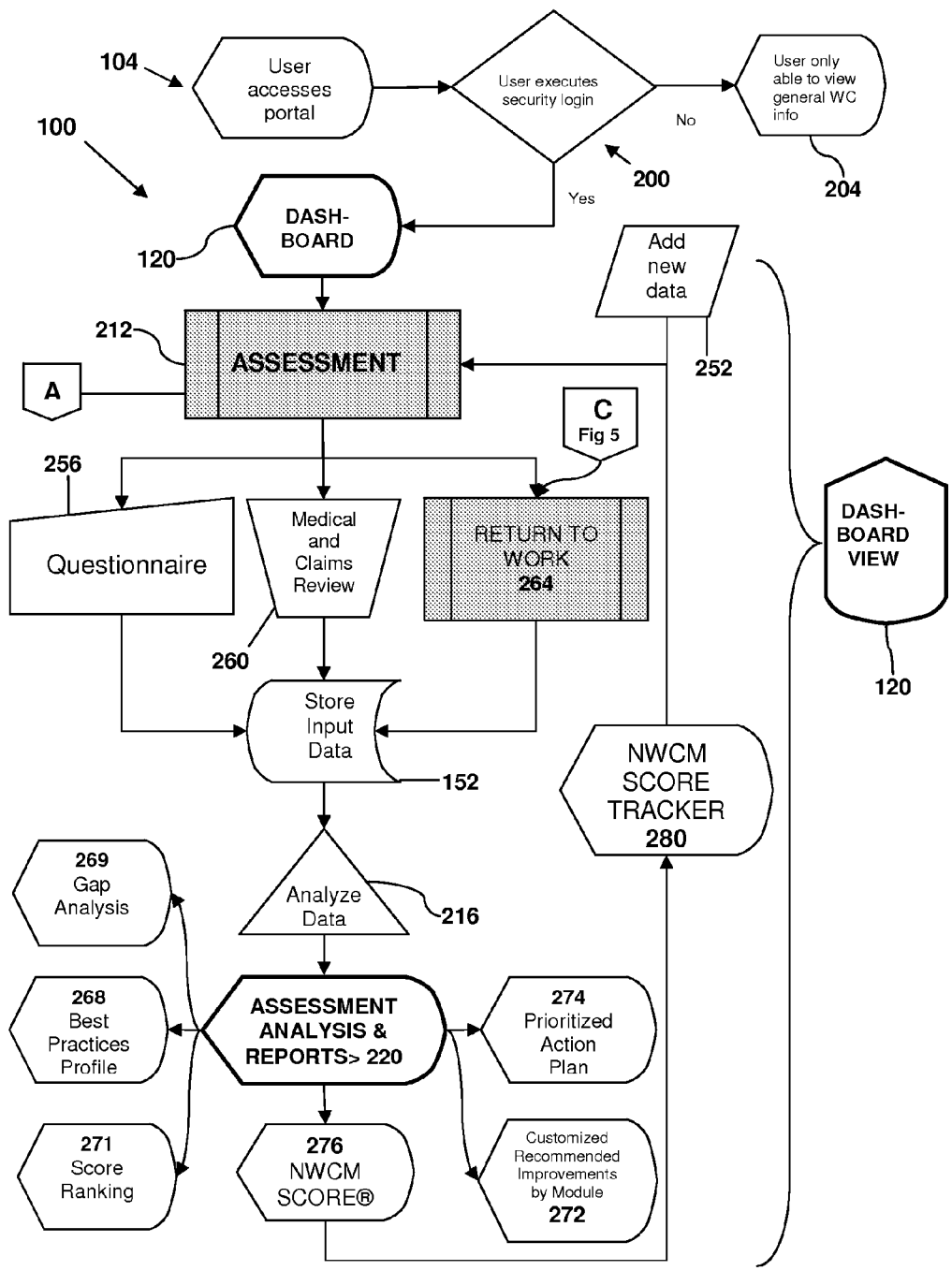
FIG. 3 is a flow diagram illustrating an embodiment of the assessment method of the invention.

FIG. 3 is a flow diagram of the method of the present invention 100 showing a preferred method of the assessment 212. Upon accessing the dashboard 120 the user 104 is presented with a plurality of processes 208 as described above. The assessment 212 comprises a plurality of elements including but not limited to a workers' compensation program questionnaire 256, in-house specialist medical and claims reviews 260, and review of injured employee return to work program 264. In an alternative embodiment, the return to work process 264 may be included in data benchmarking 232. The inputs from the questionnaire 256 and any specialist claim reviews 260 are stored 152 and analyzed 216 as described to provide the user 104 with relevant data compilations in reports 220 including but not limited to a Best Practices Profile Ranking 268, a Best Practices Gap Analysis 269, a National Workers' Compensation Management Score® 270, a National Workers' Compensation Management Score® Ranking 271, a National Workers' Compensation Management Score® Tracker 272, Customized Recommendations for Improvement by Module (CRIM) 273, and a Prioritized Action Plan for Multi-site Employers 274.

Figure 9:
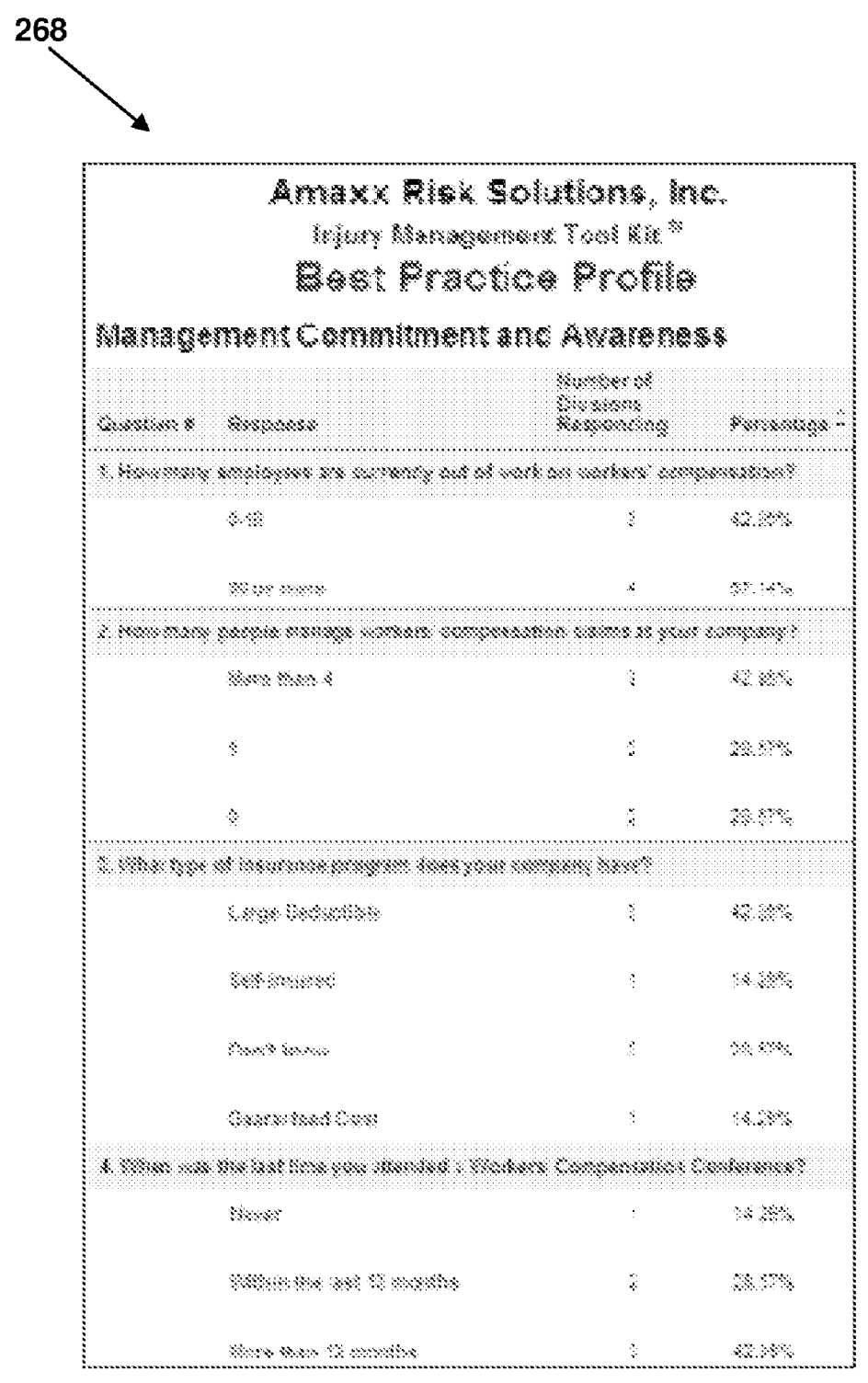

The Best Practices Profile Report—The Best Practice Profile Report 268 is a compilation of all current best practices in place at all operating units of a company. The Best Practices Profile Report 268 is an aggregate overview of all responses by all units indicating the knowledge level of the users 104 and how many best practices are in place in their unit or company. In the embodiment of FIG. 9 the Best Practices Profile Report 268 identifies cost problem areas in a sample multi-location workers' compensation program. Preferably, data for the Best Practices Profile Report 268 comprises percentages of responses of each best practice for all locations by methods known in the art.

In FIG. 9 seven units of a company have taken their individual best practice assessments 212. In Question 3, only 42% of users 104 (3 units in this case) have responded that they know that their company has a large deductible ($2,000,000.00) in their workers' compensation insurance program. This is the correct answer for their company, but less than half of the other users 104 were aware of this major cost driver. The other users 104 incorrectly answered that that they thought they were either completely self-insured (14.29%), covered by guaranteed cost (14.29%), or simply did not know (28.57%). Thus, the percentages in the report 268 indicate which concepts need to be addressed in training. In the present example of FIG. 9, the responses indicate that the training needs to start with the very basic concepts of the type of workers' compensation insurance program since the majority of users did not know the current program. The majority appeared to have thought that another company was paying for their losses. Whereas in reality it was their own company that was paying using a high deductible program. The method of the present invention may also be described as a corporate-wide needs assessment showing management the areas for cost saving improvement. The Best Practices Profile Report 268 provides a list of potential problem areas at a plurality of units and identifies opportunities for improvement across business groups. Preferably, based on percentages, issues are identified and implementation strategies are prioritized for inclusion in a timetable.

Best Practices Gap Analysis Report—The Best Practices Gap Analysis Report 269 illustrates which best practices have the most room for improvement. Preferably, data for the Best Practices Gap Analysis Report 269 comprises data of the percentage of recommendations received by all operating units for the entire company after the assessment has been completed. Each unit receives recommendations from their individual assessments, then the recommendations are compiled into the Gap Analysis Report 269 for a group of units, or the entire company. In comparison, the Best Practices Profile Report 268 comprises percentages of responses, whereas Best Practices Gap Analysis Report 269 is percentages of recommendations. (emphasis added)

Figure 10:
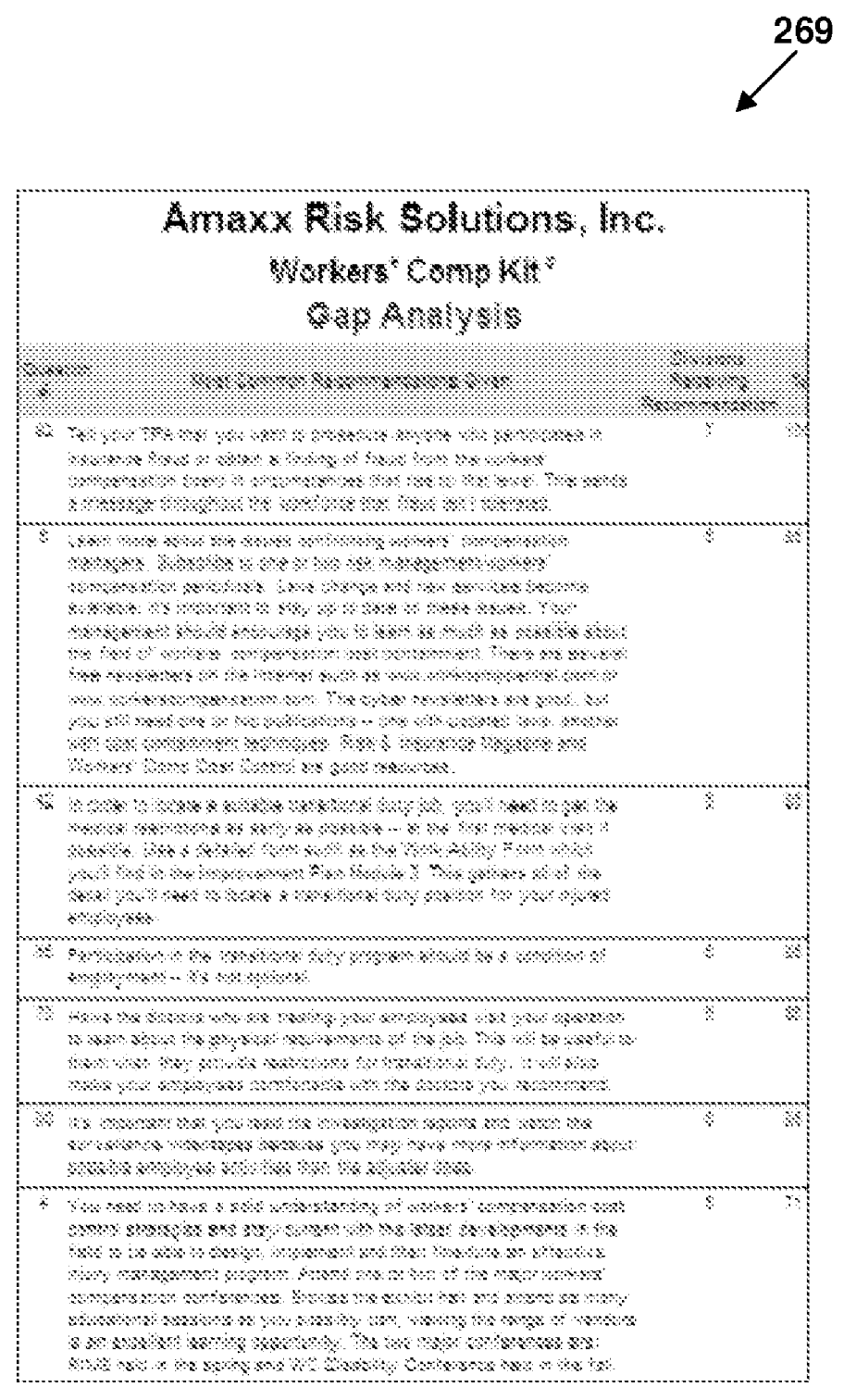

In the embodiment as shown in row one of FIG. 10, seven divisions or units received this written recommendation from question 82 of the assessment. The 100% failure rate indicated on the far right means that none of the seven divisions or units has implemented the recommendation. The data was analyzed by calculating the recommendations that have the highest to lowest percentage of implementation in the entire company. Thus, 100 percent of divisions responding to this question have not implemented the best practice. The Best Practices Gap Analysis Report 269 in FIG. 10 lists results from the data analysis from highest to lowest percentage and thereby identifies the gaps between current performance and best practice. This analysis is then utilized in prioritizing action steps 274 for an improvement plan 244 strategy and to determine company workers' compensation program training needs.

The National Workers' Compensation Management Score®—The National Workers' compensation Management Score 270 identifies strengths and weaknesses in the effectiveness of implementation of a plurality of cost control and cost reduction processes in the workplace. Questions reflecting best practices recognized in an industry provide consistent criteria for analysis that may be utilized by the user 104 similar to a credit score for their industry. The National Workers' Compensation Management Score 270 is preferably presented within a range of 1-100.

Figure 11:
FIG. 11 is a screenshot of a computer user interface showing an embodiment of the National Workers' Compensation Management Score and the Score Ranking of the method of the present invention.

In the embodiment of FIG. 11, data for the National Workers' Compensation Management Score 270 analysis comprises preferably a point value (from −2 to +5) assigned to each response to the best practice assessment questions and then the sum of the responses is calculated, and that sum is presented to the user as the score 270. It informs the user about the cost control effectiveness of the workers' compensation management program 100 as currently implemented.

National Workers' Compensation Management Score® Ranking, Best-To-Worst and Worst-to-Best—In addition to the score 270, the method calculates a National Workers' Compensation Management Score® Ranking 271, which is a percentile ranking of the score 270 in comparison to scores 270 from other users or units 104. In Best-to-Worst ranking, any unit with a higher score is placed above any unit with a lower score in the table or list thus producing the ranking of units. Inverting the values produces the converse table or list, Worst-to-Best. In the embodiment of FIG. 11, seven business units 104 have received their National Workers' Compensation Management Score 270 and are ranked from the top as best-to-worst as elected by the user 104. Thus each business unit is compared to the others in FIG. 11, and the overall average score for the company as a whole, 50.57, is also calculated by adding the individual unit scores and dividing by the number of scores.

Figure 12:
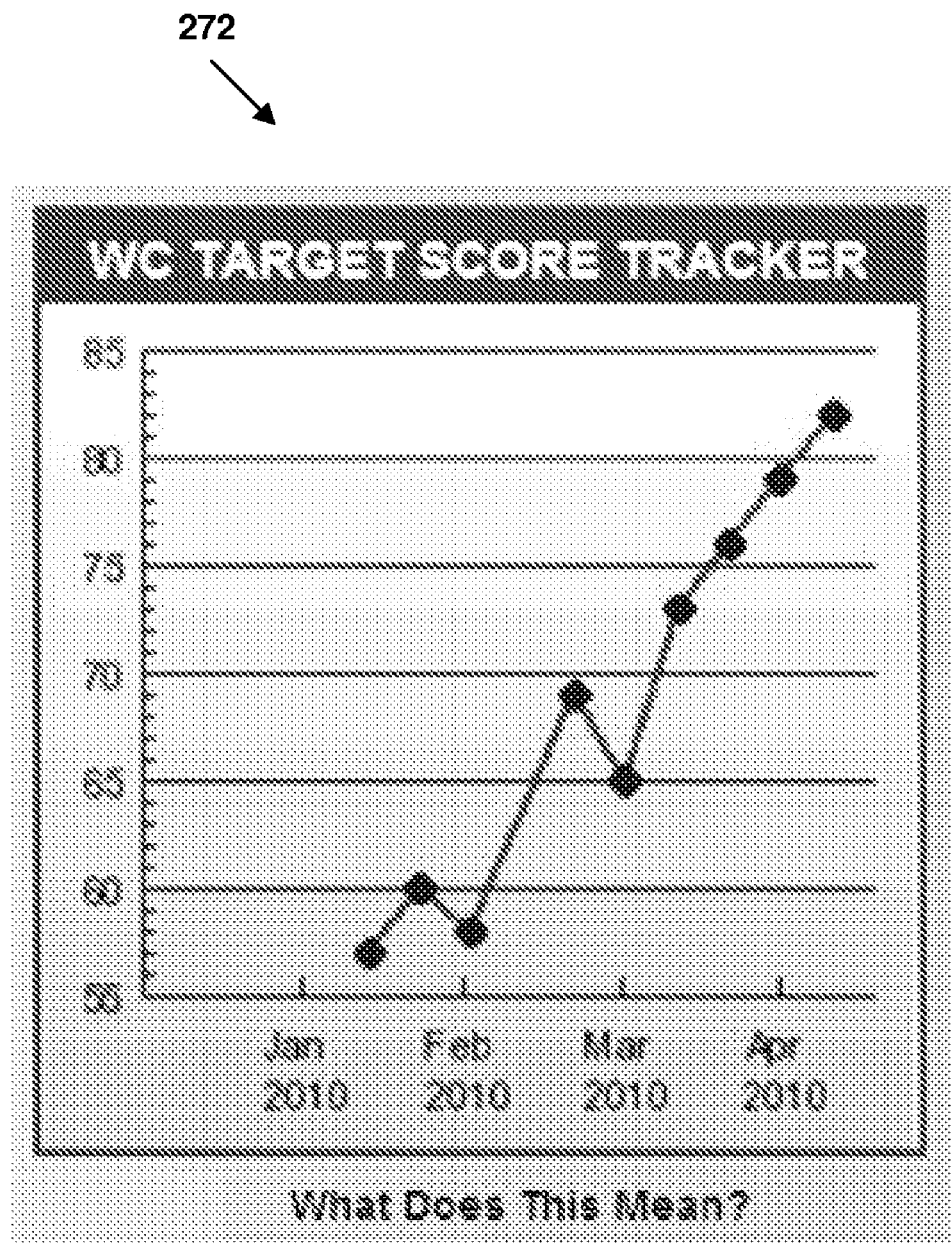
FIG. 12 is a screenshot of a computer user interface showing an embodiment of the National Workers' Compensation Management Score Tracker of the present invention.

National Workers' Compensation Management Score® Tracker—The National Workers' Compensation Management Score® Tracker 272 monitors program improvement in cost control as shown in FIG. 12. As recommendations 273 from the assessment 212 are implemented, the score 270 from the best practices preferably rises. In a preferred embodiment, the Tracker illustrates the changes in a table or bar graph where the Y axis represents the National Workers' Compensation Management Score® values and the X axis represents elapsed program time, such as weeks, months or years. By continuously plotting scores 270 over time, the rate of change preferably cause the line to elevate indicating improvement in cost controls. The score 270 may then be input onto the National Workers' Compensation Management Score® Tracker 272 graphical display to visually inform the user of performance of best practice implementation over time. Thus the National Workers' Compensation Management Score® Tracker 272 is preferably utilized as a measure of program improvement over time. Thereafter, as additional recommendations 273 are implemented the best practice assessment 212 is repeated and a new score 270 is generated, thus demonstrating any incremental change, preferably improvement.

Customized Recommendations for Improvement Prioritized Action Plan for multi-site companies—Once a multi-site user receives their score 270, or scores, the method uses the input from the assessment questionnaire 256 to determine a written compilation of Customized Recommendations for Improvement in a Prioritized Action Plan for Multi-site Companies 274 specific to the user, unit, division or company as a whole. Preferably, the CRI print out in a numerical list format and then in a timetable as an Action Plan. The review and implementation team gets together to review the CRI and Action Plan, prioritizes the recommendations, selects those recommendations to be implemented, sets up a timetable for implementation and completion. To assist in implementation and decision making process, the user has access to online training and educational materials specific to each recommendation. Preferably the educational tools include but are not limited to documents, templates, forms, checklists, presentations, scripts, form letters and brochures to assist in customizing the program.

The assessment 212 can be completed by various organizational units 104 or departments within a corporation for comparison and produce individualized plans 274 per organizational unit 104 or department. In addition, the assessment 212 can be accessed, edited or updated at anytime. If edited, the assessment method 212 will re-calculate the score 270 and modify the list of recommendations 273 as necessary.

Figure 13:
FIG. 13 is a screenshot of a computer user interface showing an embodiment of the Customized Recommendations for Improvement and the Workers' Compensation Action Plan of the present invention.

In a preferred embodiment of FIG. 13, Customized Recommendations for Improvement 273 are provided for a multi-location employer in a table format 274. As the changes in the Customized Recommendations for Improvement 273 are implemented, the Action Plan 274 timetable tracks the status and results for each item. By inputting the type and status of each action, progress may be indicated by color-coding corresponding to completion status. For example, red for 'not implemented', yellow for 'partially implemented', and green for 'fully implemented'. Color-coding allows the user to determine at a glance what progress is (or is not) being made. The preferable goal is that every item in the Action Plan 274 timetable is changed to green over time.

Analysis of a generated score 270 is preferably by comparing the score to a group of score 270 ranges that generally indicate efficiency of implementation of best practices. In one embodiment where the range is 1 to 100, Score Groups are set at 1-25, 26-50, 51-75 and 76-100. Score Group 1-25 generally indicates poor performance in program management, possibly a lack of management commitment, and significant room for improvement. Score Group 26-50 indicates that a few best practices have been implemented, or those that are implemented are not performing as expected due to lack of user knowledge, experience, time, etc. Score Group 51-75 generally indicates that progress has been made in implementation of the recommended best practices following design and implementation of the procedures, but that additional work is required to attain better efficiency in management. Score Group 76-100 generally indicates the majority of recommended best practices have become integrated into the employer, or corporate culture, and the results of implementing the recommendations has significantly improved program efficiency and reduced costs. Thus, the achievement of a high score indicates that the program is the best among their peers. The Customized Recommendations for Improvement are generated from the score. The lower the score the greater the number of recommendations generated since the score indicates poor efficiency and quality control. Thus there is an inverse relationship between the score value and the number of recommendations generated.

Figure 4:
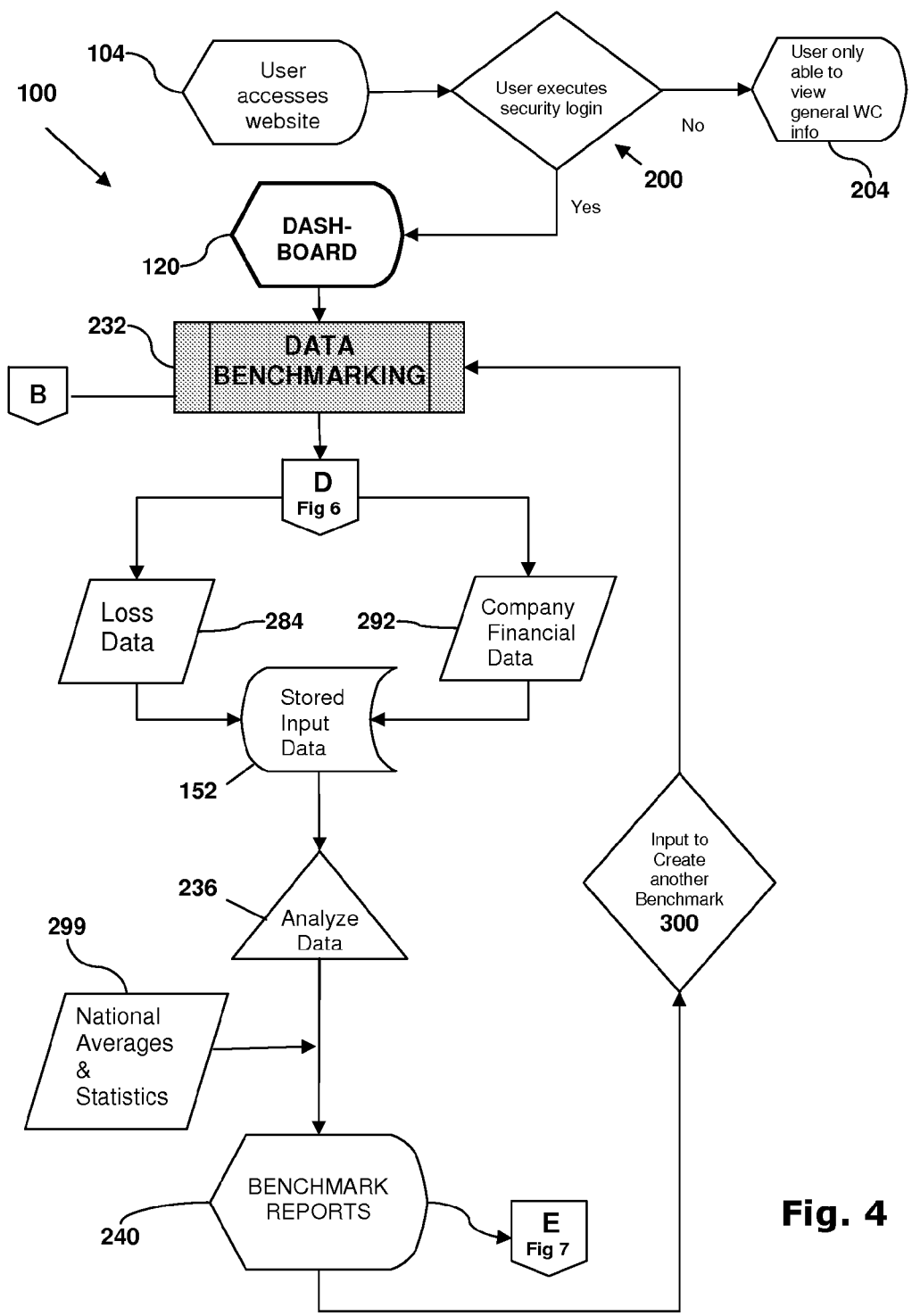
FIG. 4 is a flow diagram illustrating an embodiment of the data benchmarking method of the invention.

FIG. 4-Data Benchmark process—The next step in the preferred embodiment of the method 100 is the data benchmark process 232 of FIG. 4. Users input various company information data 152 which is analyzed 236 and used to generate financial and performance benchmarks 240 for the company. The company has the ability to enter various benchmarks for different years or organizational units. Input claims loss data 284 is preferably the first type of data to be entered, and comprises loss data incurred for lost time claims 285, loss data incurred for medical claims 286, and loss data incurred for expenses 287, and the total incurred for loss claims. Preferably, the second type of data to be entered for the benchmark analysis is corporate data 292 comprising total revenue 293, total payroll 294, total number of man hours 295 and profit margin 296.

Once the financial and other relevant benchmark data is input by the user 104, the system 100 analyzes the information to produce one or more benchmark reports 240 which provide calculations of a plurality of measurements, and then compares the measurements to national averages and statistics. The comparative group metrics are derived from information published by sources of national benchmarks, including but not limited to: Workers Comp Research Institute (WCRI) Data, Bureau of Census, Bureau of Labor Statistics, Risk and Insurance Management Society (RIMS) Benchmarking Survey, National Council on Compensation Insurance (NCCI) Annual Statistical Survey, and the National Academy of Social Insurance. This allows the user 104 to clearly see where the company stands in relation to national averages in areas pertaining to workers' compensation cost control. As mentioned above, the user 104 has the ability to enter a plurality of benchmarks 284 and 292. The most common use of this functionality is to enter various years or organizational units/departments for comparison reasons. If the user 104 would like to enter another benchmark 300 they can do so by clicking the 'add new benchmark' button on the proprietary application 116 and repeat the steps 108.

FIG. 5—Return to Work—In FIG. 5, The return to work process 264 enables users to enter information about injured employees to gain an understanding of how long their employees are out of work and how effective the company's transitional duty program is performing. The return to work process 264 comprises a plurality of relevant data inputs regarding the injured employee and the company. Employee personal information is the first type of data 352 that users will enter, one use of which is to generate custom letters to employees. Identifying information comprising name, address and job title, will be pulled from both the user profile and return to work input. It will be used to generate communications such as on-the-fly (real-time) documents with dynamic headers, saving the user time in document creation and modification. The second type of data that must be entered is the detail about the injury comprising the date of the injury 356, the date that the employee returned to work 360, and the waiting period (in days) 364. The system then analyzes 368 the information provided by the user about all injured employees entered into the system to generate one or more return to work reports 372. In the background the system compiles that information and displays the analysis in methods known in the art, such as a bar graph (see FIG. 14). The system then groups the employees by the number of days it took for them to return to work as a ratio 376. In addition, the report displays the total number of lost days 380 and the total number of injured employees claims 384 entered. Users 104 will also have the ability to sort by a specified date range. If the user 104 would like to add an additional employee 388 they have the ability to click the 'Add New Episode' button on the application and repeat the relevant steps. The method 100 will re-analyze the information and adjust the graph or other visual representation as necessary.

Figure 5:
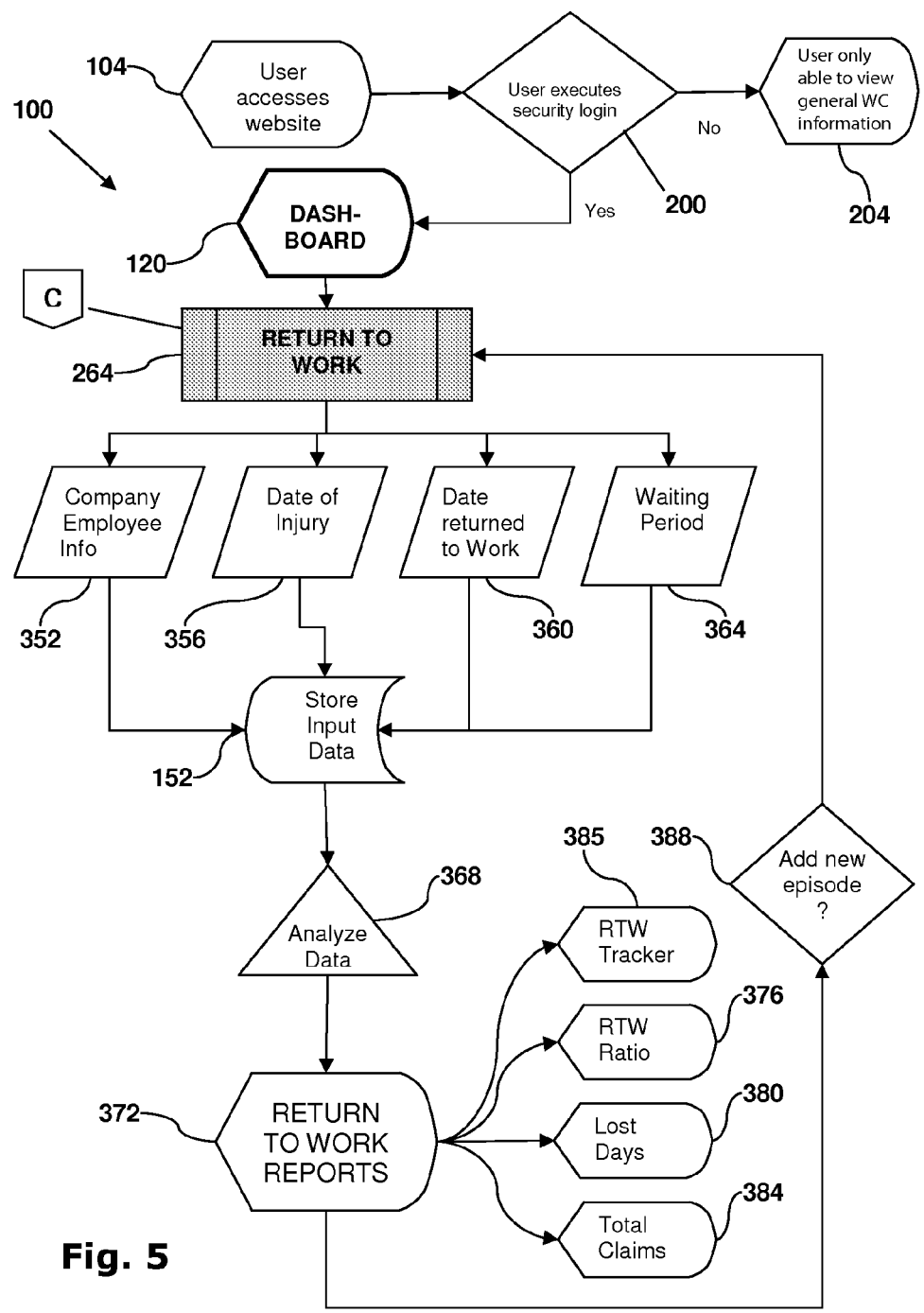
FIG. 5 is a flow diagram illustrating an embodiment of the return to work method of the invention.

FIG. 5 is a flow diagram of the method of the present invention 100 showing a preferred method of the return to work process 264. In addition, the return to work 264 analysis provides specific reports relevant to that function, as described in FIG. 5 below.

Upon accessing the dashboard 120 the user 104 is presented with a plurality of processes 208 as described above, including the return to work process 264. The return to work process 264 comprises a plurality of input elements including, but not limited to, employee information 352, date of injury 356, date returned to work 360 and the waiting period 364. The data inputs for return to work 264 are input, stored 152 and analyzed 368 as previously described. The user 104 is provided with a plurality of reports 372 including but not limited to a return to work ratio 376, lost days 380, total claims 384 and return to work tracker 385. An advantage of the return to work process 264 is that new return to work data 388 may be added at any time, or the process may be repeated as programs improvements are implemented. A further advantage of the return to work process 264 is that the plurality of reports 372 enables the workers' compensation program manager to identify individual elements and assign independent goals for those elements, thereby providing enhanced flexibility of program management.

Return to Work Ratio—Preferably, the Return to Work Ratio 376 is expressed as a ratio of X to Y where X is the number of days that it takes for an employee to return to work (date of return to work 360 minus the date of injury 356), and Y is the number of employee claims. The goal is to return as many workers as possible to work in as short a time as possible. In one embodiment, the analysis for the Return to Work Ratio 376 is accomplished by dividing the number of days to return to work of each injury in a workers' compensation claim in the numerator by the total number of claims in the denominator, which average is displayed in comparison to industry, governmental, geographical or other averages selected for comparison by the user.

Figure 14:
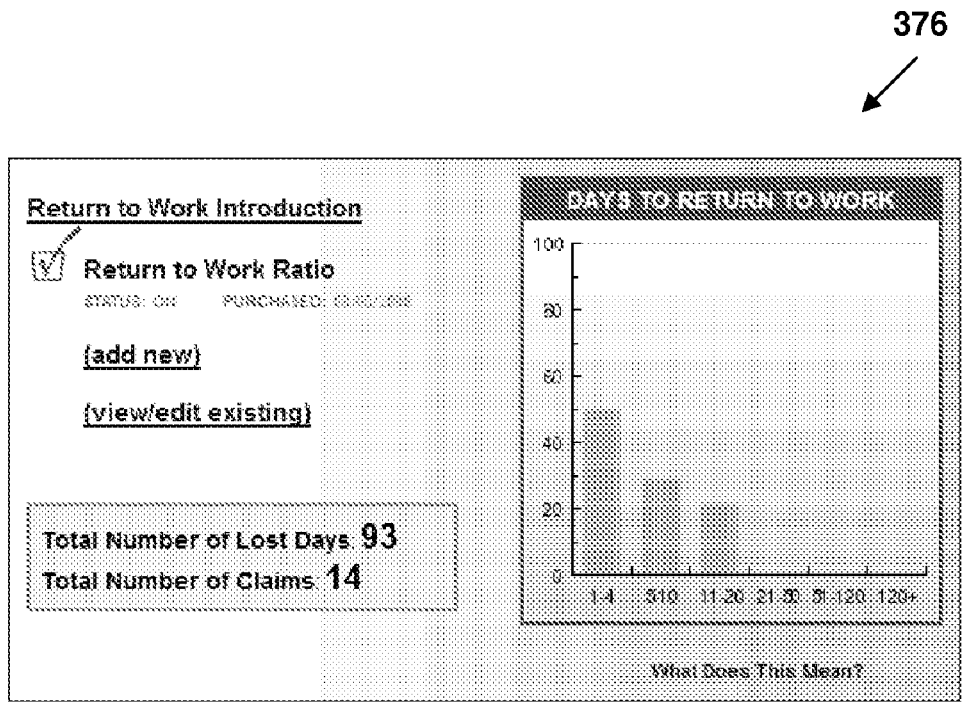
FIG. 14 is a screenshot of a computer user interface showing an embodiment of the Return to Work Ratio and Return to Work Ratio Tracker graphical representations of the present invention.
Figure 14:
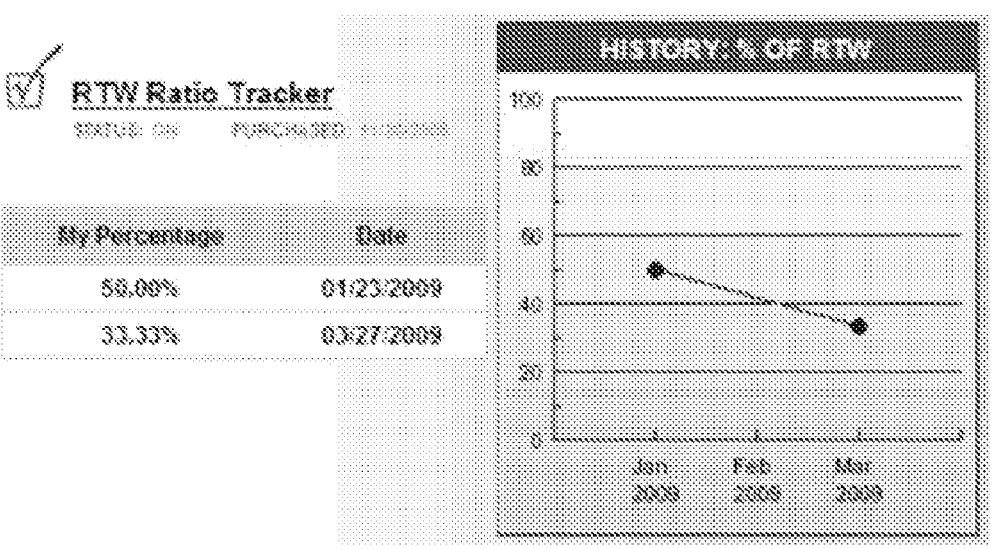

The Return to Work Ratio 376 provides management with a numerical assessment of the effectives of the return-to-work program. In the embodiment of FIG. 14 the goal is to return more workers in the least number of days, preferably having the highest percentage return in the 1-4 days column. In FIG. 14 the data from the user 104 is input into the bar graph and indicates that there were 93 lost work days 380 from 14 workers' compensation claims 384. To generate the bar graph the user 104 inputs the date of injury 356 and the date returned to work 360. The graph allocates the data according to pre-set categories of 1-4 days, 5-10 days, 11-20 day, 21-50 days, 51-120 days and 120+ days for each claim. Workers' Compensation payments are made up of medical costs and lost wages (indemnity). Thus the sooner an employee returns to work, the more the employer saves in the two costs identified above, and the employee experiences fewer medical problems. In the Return to Work Ratio 376 of the present invention, the preferable goal for the user 104 is to have the majority of employees return to work in 1-4 days. This is an acceptable range as it indicates the lowest indemnity cost.

Return to Work Ratio Tracker—The Return To Work Ratio Tracker 385 illustrates the rate at which employees are either returning to work or are predicted to return to work. When new claim data 284 is input, the graph and data history and graph predict when the employee will be returned to work. In the embodiment of FIG. 14, the Return to Work Ratios 376 collected over time are input on a graph by methods known in the art. The graph predicts a downward trend, or longer days out of work per claim, which will increase costs. In the beginning, the user may make a prediction or estimate of how long the employee will be out of work, which then acts as a data outlier.

Preferably, the Return to Work Tracker is expressed as a line graph where X is represented as a consecutive period of time, i.e., months over which the data is compiled for the employee return-to-work time frame, and Y is the calculated Return-to-Work ratio. Thus the newly calculated ratio for each period of time is sequentially plotted. Thus the trend of the graph predicts the future results of the currently implemented best practices of the return to work program. The goal is to have the slope of the line increase over time indicating the return to work of as many workers as possible in as short a time as possible. An effective return to work program gets 90-95% of employees back to work 1-4 days after the injury.

So, any result less than 95% indicates inefficiency and that improvements are indicated. A negative trend indicates that employees are spending too much time out of work thereby increasing indemnity and medical costs of a lost time claim, the employer is not returning the employee back to work fast enough, and the program is significantly inefficient. A negative trend indicates the need for changes and an immediate commitment of resources to implement the customized recommendations for improvement. A neutral trend, or approximately 50% of maximum, even though an improvement over a negative trend, is still substantially below the recommended 95% indicating that the program retains inefficiencies. A neutral trend is an indicator similar to a negative trend in that high losses will continue until the resources are committed to implementing all of the recommended best practices. Whereas, a positive trend indicates positive steps of improvement in implementation of the recommended best practices with greater program efficiency and reduced costs. A 95% or better ratio indicates that the recommended best practices have been fully implemented and are well managed.

Figure 6:
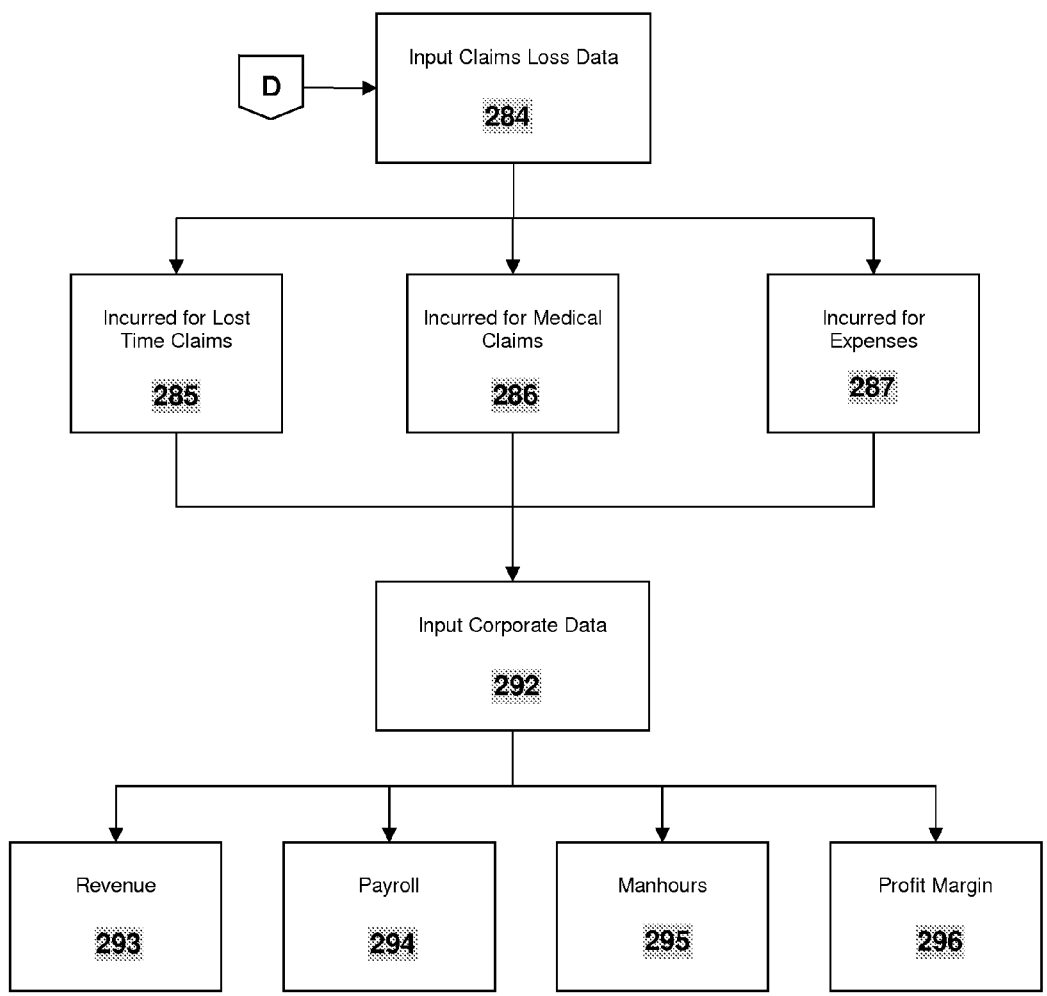
FIG. 6 is a flow diagram illustrating an embodiment of the data inputs for the data benchmarking method of the invention.

FIG. 6—Input Claims Loss Data—More particularly, FIG. 4 is a flow diagram of the method of the present invention 100 showing a preferred method of the data benchmarking 232. Upon accessing the dashboard 120 the user 104 is presented with a plurality of processes 208 as described above. The data benchmarking process 232 comprises a plurality of input elements including, but not limited to, financial losses 284 related to the workers' compensation claims and company financial data 292. The preferred input elements of the financial losses 284 are demonstrated in FIG. 6 comprising losses for lost time 285, medical expenses 286 and program expenses 287. The preferred inputs for company financial information 292 comprise revenue 293, payroll 294, man hours 295 and profit margin 296. The data inputs 284 and 292 are stored 152 and analyzed 236 as previously described, including comparisons to national averages and statistics 299 to provide the user 104 with a plurality of data benchmarks reports 240 as shown in FIG. 7.

Figure 7:
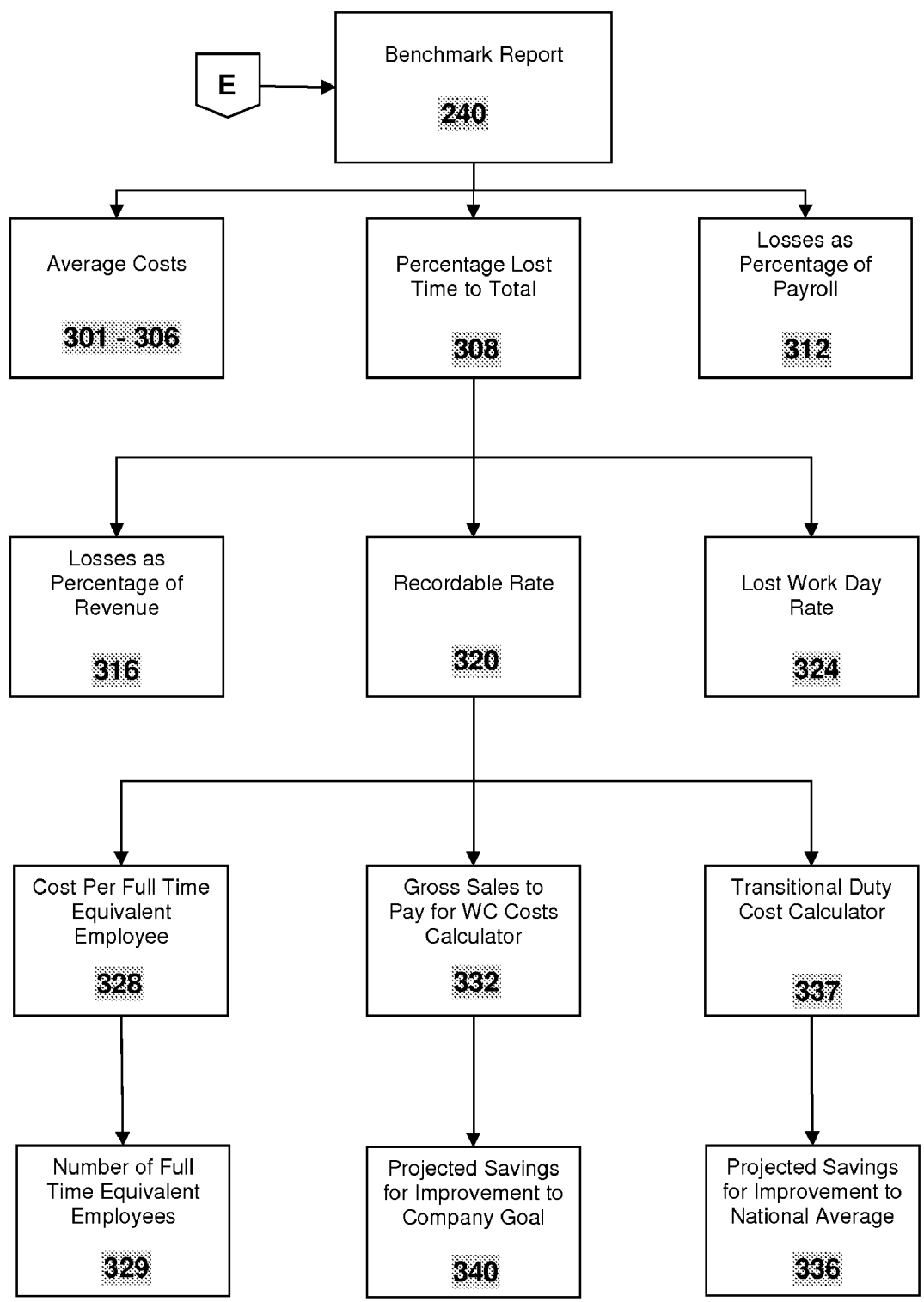
FIG. 7 is a flow diagram illustrating an embodiment of the data reports for the data benchmarking method of the invention.

FIG. 7—Benchmark reports—Benchmark reports generated as shown in FIG. 7 include but are not limited to average cost per workers' compensation claim 301, average indemnity cost per lost time claim 302, average medical cost per lost time claim 303, average expense cost per lost time claim 304, average cost per lost time claim 305, average cost per medical only claim 306, percentage lost time to total 308, losses as percentage of payroll 312, losses as percentage of revenue 316, recordable rate 320, lost work day rate 324, cost per full time equivalent employee 328, number of full time equivalent employees 329, Gross Sales to Pay for Workers' Compensation Costs Calculator 332, projected savings for improvements to national average 336, and projected savings for improvements to company goals 340. An advantage of the data benchmarking process 232 is that new data 300 may be added at any time, or the process may be repeated as improvements are implemented. A further advantage of the data benchmarking 232 is that the plurality of reports 240 enables the workers' compensation program manager to identify individual elements and assign independent goals for those elements, not just an overall program bottom line target, thereby providing enhanced flexibility of program and cost control management.

In one embodiment, the analysis for the Average Cost Per Workers' Compensation Claim 301 is accomplished by dividing the total cost incurred for the unit workers' compensation claims in the numerator by the total number of claims in the denominator, which average is displayed in comparison to industry, governmental, geographical or other company reference averages selected for comparison by the user. Preferably, initial benchmarking of 301 establishes a value in the report 240 that may be used as a baseline to compare current workers' compensation program efficiency to programs of other entities, and to future performance. After the initial data benchmarking of 301, the next step is to establish a goal, or value, in relation to the reference average and then implement those recommendations 228 provided in the assessment 212 specific to 301 to work toward that goal. The goal is at least a value below the average, which indicates program performance 100 better than average, or another goal selected by the user 104 or management.

In one embodiment, the analysis for the Average Indemnity Cost Per Lost Time Claim 302 is accomplished by dividing the total indemnity cost incurred for the unit workers' compensation claims in the numerator by the total number of lost time claims in the denominator, which average is displayed in comparison to industry, governmental, geographical or other company reference averages selected for comparison by the user. [Preferably, initial benchmarking of 302 establishes a value in the report 240 that may be used as a baseline to compare current workers' compensation program efficiency to programs of other entities, and to future performance. After the initial data benchmarking of 302, the next step is to establish a goal, or value, in relation to the reference average and then implement those recommendations 228 provided in the assessment 212 specific to 302 to work toward that goal. The goal is at least a value below the average, which indicates program performance 100 better than average, or another goal selected by the user 104 or management.

In one embodiment, the analysis for the Average Medical Cost Per Lost Time Claim 303 is accomplished by dividing the total medical cost incurred for the unit workers' compensation claims in the numerator by the total number of lost time claims in the denominator, which average is displayed in comparison to industry, governmental, geographical or other company reference averages selected for comparison by the user. [Preferably, initial benchmarking of 301 establishes a value in the report 240 that may be used as a baseline to compare current workers' compensation program efficiency to programs of other entities, and to future performance. After the initial data benchmarking of 301, the next step is to establish a goal, or value, in relation to the reference average and then implement those recommendations 228 provided in the assessment 212 specific to 301 to work toward that goal. The goal is at least a value below the average, which indicates program performance 100 better than average, or another goal selected by the user 104 or management.

In one embodiment, the analysis for the Average Expense Cost Per Lost Time Claim 304 is accomplished by dividing the total expenses incurred for the unit workers' compensation claims in the numerator by the total number of lost time claims in the denominator, which average is displayed in comparison to industry, governmental, geographical or other company reference averages selected for comparison by the user. Preferably, initial benchmarking of 304 establishes a value in the report 240 that may be used as a baseline to compare current workers' compensation program efficiency to programs of other entities, and to future performance. After the initial data benchmarking of 304, the next step is to establish a goal, or value, in relation to the reference average and then implement those recommendations 228 provided in the assessment 212 specific to 304 to work toward that goal. The goal is at least a value below the average, which indicates program performance 100 better than average, or another goal selected by the user 104 or management.

In one embodiment, the analysis for the Average Cost Per Lost Time Claim 305 is accomplished by dividing the total costs incurred for the unit workers' compensation claims in the numerator by the total number of lost time claims in the denominator, which average is displayed in comparison to industry, governmental, geographical or other company reference averages selected for comparison by the user. Preferably, initial benchmarking of 305 establishes a value in the report 240 that may be used as a baseline to compare current workers' compensation program efficiency to programs of other entities, and to future performance. After the initial data benchmarking of 305, the next step is to establish a goal, or value, in relation to the reference average and then implement those recommendations 228 provided in the assessment 212 specific to 305 to work toward that goal. The goal is at least a value below the average, which indicates program performance 100 better than average, or another goal selected by the user 104 or management.

In one embodiment, the analysis for the Average Cost Per Medical Cost Only Claim 306 is accomplished by dividing the total medical cost incurred for the unit workers' compensation claims in the numerator by the total number of medical claims in the denominator, which average is displayed in comparison to industry, governmental, geographical or other company reference averages selected for comparison by the user. Preferably, initial benchmarking of 306 establishes a value in the report 240 that may be used as a baseline to compare current workers' compensation program efficiency to programs of other entities, and to future performance. After the initial data benchmarking of 306, the next step is to establish a goal, or value, in relation to the reference average and then implement those recommendations 228 provided in the assessment 212 specific to 306 to work toward that goal. The goal is at least a value below the average, which indicates program performance 100 better than average, or another goal selected by the user 104 or management.

In one embodiment, the analysis for the Percentage of Lost Time Claims to Total Claims 308 is accomplished by dividing the number of lost time workers' compensation claims for the unit in the numerator by the total number of claims in the denominator, which percentage is displayed in comparison to industry, governmental, geographical or other company reference averages selected for comparison by the user. Preferably, initial benchmarking of 308 establishes a value in the report 240 that may be used as a baseline to compare current workers' compensation program efficiency to programs of other entities, and to future performance. After the initial data benchmarking of 308, the next step is to establish a goal, or value, in relation to the reference average and then implement those recommendations 228 provided in the assessment 212 specific to 308 to work toward that goal. The goal is at least a value below the average, which indicates program performance 100 better than average, or another goal selected by the user 104 or management.

In one embodiment, the analysis for the Average Losses as a Percentage of Payroll 312 is accomplished by dividing the total cost incurred for the unit workers' compensation claims in the numerator by the total gross payroll in the denominator, which average is displayed in comparison to industry, governmental, geographical or other company reference averages selected for comparison by the user. Preferably, initial benchmarking of 312 establishes a value in the report 240 that may be used as a baseline to compare current workers' compensation program efficiency to programs of other entities, and to future performance. After the initial data benchmarking of 312, the next step is to establish a goal, or value, in relation to the reference average and then implement those recommendations 228 provided in the assessment 212 specific to 312 to work toward that goal. The goal is at least a value below the average, which indicates program performance 100 better than average, or another goal selected by the user 104 or management.

In one embodiment, the analysis for the Average Losses as a Percentage of Revenue 316 is accomplished by dividing the total cost incurred for the unit workers' compensation claims in the numerator by the total gross revenue in the denominator, which average is displayed in comparison to industry, governmental, geographical or other company reference averages selected for comparison by the user. Preferably, initial benchmarking of 316 establishes a value in the report 240 that may be used as a baseline to compare current workers' compensation program efficiency to programs of other entities, and to future performance. After the initial data benchmarking of 316, the next step is to establish a goal, or value, in relation to the reference average and then implement those recommendations 228 provided in the assessment 212 specific to 316 to work toward that goal. The goal is at least a value below the average, which indicates program performance 100 better than average, or another goal selected by the user 104 or management.

In one embodiment, the analysis for the Recordable Rate 320 is accomplished by dividing the total number of workers' compensation claims for the unit in the numerator by the full time equivalent (FTE) workers divided by 100 in the denominator, which rate is displayed in comparison to industry, governmental, geographical or other company reference averages selected for comparison by the user. The FTE workers value is equal to the number of man hours worked in that unit divided by 2000. Preferably, initial benchmarking of 320 establishes a value in the report 240 that may be used as a baseline to compare current workers' compensation program efficiency to programs of other entities, and to future performance. After the initial data benchmarking of 320, the next step is to establish a goal, or value, in relation to the reference average and then implement those recommendations 228 provided in the assessment 212 specific to 320 to work toward that goal. The goal is at least a value below the average, which indicates program performance 100 better than average, or another goal selected by the user 104 or management.

In one embodiment, the analysis for the Lost Work Day Rate 324 is accomplished by dividing the sum of days lost for workers' compensation claims from the unit in the numerator by the man hours worked in the denominator, multiplied by 200,000, which rate is displayed in comparison to industry, governmental, geographical or other company reference averages selected for comparison by the user. Preferably, initial benchmarking of 324 establishes a value in the report 240 that may be used as a baseline to compare current workers' compensation program efficiency to programs of other entities, and to future performance. After the initial data benchmarking of 324, the next step is to establish a goal, or value, in relation to the reference average and then implement those recommendations 228 provided in the assessment 212 specific to 324 to work toward that goal. The goal is at least a value below the average, which indicates program performance 100 better than average, or another goal selected by the user 104 or management.

In one embodiment, the analysis for the Average Losses per FTE 328 is accomplished by dividing the total costs incurred for workers' compensation claims from the unit in the numerator, by the FTE in the denominator, which average is displayed in comparison to industry, governmental, geographical or other company reference averages selected for comparison by the user. Preferably, initial benchmarking of 328 establishes a value in the report 240 that may be used as a baseline to compare current workers' compensation program efficiency to programs of other entities, and to future performance. After the initial data benchmarking of 328, the next step is to establish a goal, or value, in relation to the reference average and then implement those recommendations 228 provided in the assessment 212 specific to 328 to work toward that goal. The goal is at least a value below the average, which indicates program performance 100 better than average, or another goal selected by the user 104 or management.

In one embodiment, the analysis for the Projected Savings for Improvement to National Average 336 is accomplished by multiplying the sum of average losses per FTE minus the losses per FTE, times the FTE man hours, which number may be displayed in comparison to industry, governmental, geographical or other company reference averages selected for comparison by the user. Preferably, initial benchmarking of 336 establishes a value in the report 240 that may be used as a baseline to compare current workers' compensation program efficiency to programs of other entities, and to future performance. After the initial data benchmarking of 336, the next step is to establish a goal, or value, in relation to the reference average and then implement those recommendations 228 provided in the assessment 212 specific to 336 to work toward that goal. The goal is at least a value below the average, which indicates program performance 100 better than average, or another goal selected by the user 104 or management.

In one embodiment, the analysis for the Projected Savings for Improvement to Company FTE Goal 340 is accomplished by multiplying the sum of average losses per FTE minus the benchmark goal loss per FTE, times the FTE man hours, which number may be displayed in comparison to industry, governmental, geographical or other company reference averages selected for comparison by the user. Preferably, initial benchmarking of 340 establishes a value in the report 240 that may be used as a baseline to compare current workers' compensation program efficiency to programs of other entities, and to future performance. After the initial data benchmarking of 340, the next step is to establish a goal, or value, in relation to the reference average and then implement those recommendations 228 provided in the assessment 212 specific to 340 to work toward that goal. The goal is at least a value below the average, which indicates program performance 100 better than average, or another goal selected by the user 104 or management.

Figure 15:
FIG. 15 is a screenshot of a computer user interface showing an embodiment of the Transitional Duty Cost Calculator and the Gross Sales to Pay for Workers' Compensation Costs Calculator of the present invention.

Transitional Duty Cost Calculator—Cost savings may be estimated from return to work programs 264 by using the Transitional Duty Cost Calculator 337 as shown in FIG. 7. In the embodiment of FIG. 15, the estimated savings by using a transitional duty work program is calculated. In this example the number of days saved by using the transitional duty program is 60 days. The estimated average indemnity cost per day (derived from known data sources for their specific jurisdiction) is $200.00. At a $200.00 average per day, the estimated savings is $12,000.00. The Transitional Duty Cost Calculator 337 shows how much your company can save by bringing employees back to work at the earliest possible date. You first estimate the amount of indemnity cost saved by bringing the employee back to work as soon as possible. The second factor is the cost associated with replacing that employee, i.e., by hiring another employee, by overtime from existing employees, etc., which represents the cost of replacement labor not spent because the worker returned 60 days early. These cost savings factors are added together to get the total cost savings to the employer by returning the employee to work 60 days early.

Gross Sales to Pay for Workers' Compensation Costs Calculator—The Gross Sales to Pay for Workers' Compensation Costs Calculator 332 puts the cost of workers' compensation in perspective by showing that it is not just the incurred costs that impact a business, but rather the true cost is how much additional gross profit must be earned by the company to cover the workers' compensation costs. In the embodiment of FIG. 15, if the worker had not been returned to work 60 days early, the company would have had to spend $12,500.00. But the true cost would be the gross sales required to provide that $12,500.00 out of profit. Thus, the profit margin of the company (derived from internal data or industry averages) is used to calculate the comparable gross sales. In this example, the $192,307.69 ($12,500.00/0.065) in gross sales is required to pay for the $12,500.00 in workers' compensation costs.

Figure 8:
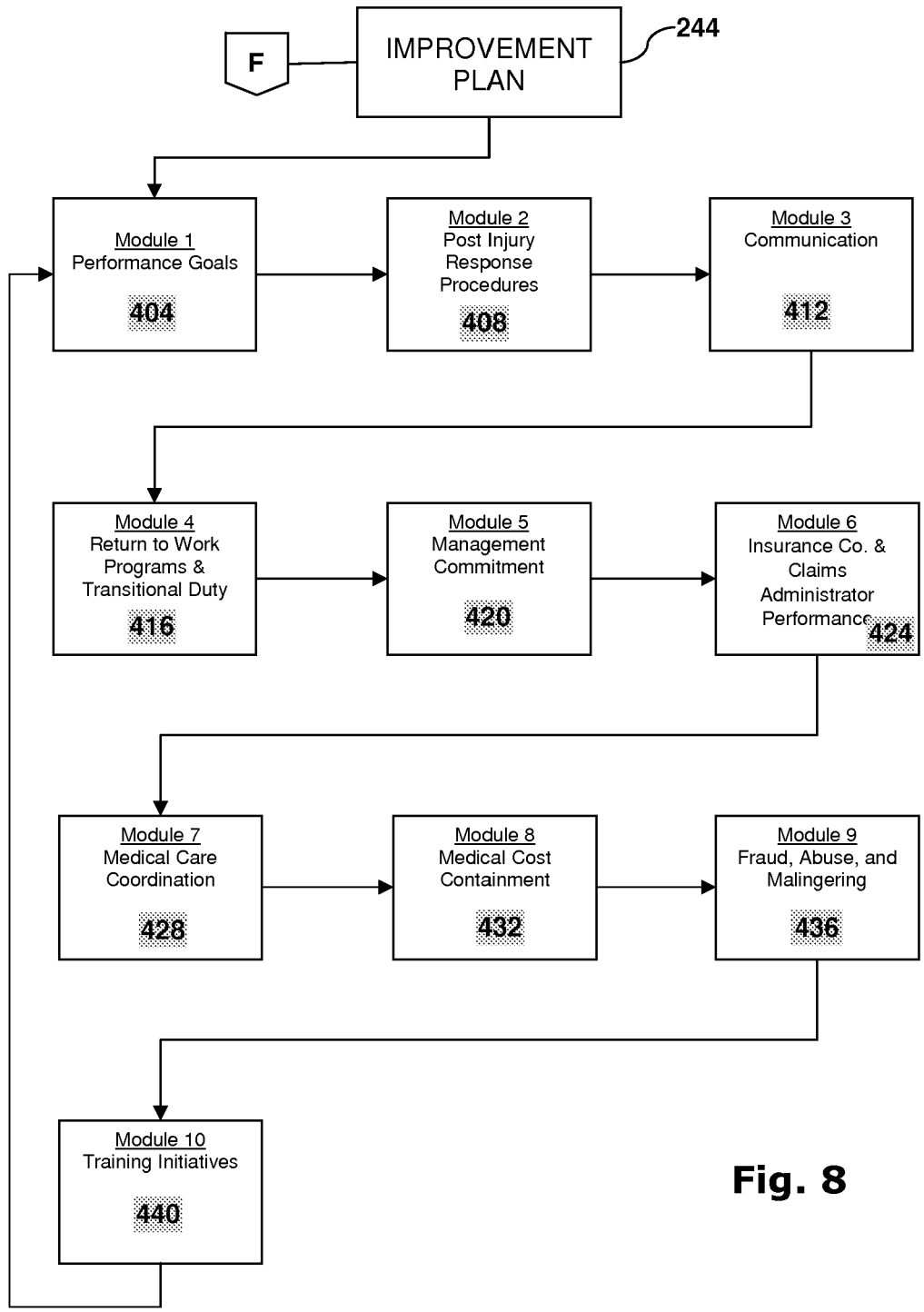
FIG. 8 is a flow diagram illustrating an embodiment of the improvement plan method of the invention.

Online Improvement Training Process—The next step in the method 100 of the present invention is for users and/or their team to proceed through the Online Improvement Training Process 244 (i.e., "training") which preferably comprises ten modules as illustrated in FIG. 8. This will provide the user not only with the information and training to successfully implement a workers' compensation cost containment program, or institute improvements in an existing program, but also with the tools with which to accomplish the tasks.

Referring now to the dashboard 120 display of an embodiment of the improvement plan 244, the training improvement plan 244 provides information about preparing to implement the new workers' compensation program. Some key points are stated to identify a team, select a team lead, name the program, and to create a timetable. A plurality of specific documents are available in each module to effect the plan 244. Preferably, the plan 244 comprises the following modules:

Module 1: Performance Goal 404—This module allows users to measure their own performance against national benchmarks to indicate success and allows companies to reward those responsible. This module uses data as well as procedural goals. Gathering correct and useful claims data is the basis for development of performance goals. Procedure goals must be set so that claims offices handle claims effectively and meet return to work targets. Locations which need improvement are given additional assistance.

Module 2: Post Injury Response Procedures 408—This module delineates the important procedures that must be completed following an accident. For example, there must be tight procedures during the 24 hours immediately after an injury so injured employees return to work as soon as medically able. Supervisors must know exactly what to do in the event of an injury. While there are many roadblocks to rapid return to work, most of those can be overcome if they are anticipated in advance and by having proper procedures in place from the moment an injury occurs until an employee returns to work.

Module 3: Communications 412—This module assists with the development of consistent claims and management procedures including forms and letters to gather information. Conveying the company's message through brochures, wallet cards, and thoughtful gestures ensures that employees understand the required company procedure in the event of an injury. Documentation is based on the role each person plays. Communications with senior management, general managers, supervisors, and employees is based on the use, grade level, language preferences and readability.

Module 4: Return to Work Programs & Procedures 416—This module details the processes of returning injured employees to work. Once an employee is injured on the job, studies show they must return to work as soon as they are medically able. The longer the time away from the substantial gainful activity of employment the less likely the employee is to return. Sometimes the employee temporarily goes back to work in a less strenuous position than their original job.

Module 5: Management Commitment 420—This module emphasizes the importance of management commitment in an effective workers' compensation program. It is imperative that upper management support changes necessary, such as the recommendations for improvement 272, to reduce workers' compensation costs and maintain productivity. This module will help users learn how to build management commitment and build a plan to get managers on board. Charge backs and allocation systems motivate all levels of the company to comply with a workers' compensation control process by rewarding success. In addition, this module provides information about available organizational resources, managing claims internally (vs. externally), roles of different departments in the program, and innovative risk management and workers' compensation cost containment techniques.

Module 6: Insurance Company and Claims Administrator Performance 424—This module describes how the insurance arrangement and claims system must be structured to support the company's processes. It is important to build a solid team approach to worker's compensation management, quality control and improvement of the claims handling procedures. Processes are built around the services provided by vendors such as medical clinics, medical providers, nurse case managers, independent medical examination physicians, investigation firms, recovery firms, structured settlement firms, defense attorneys and other services which work to help the user mitigate the cost of their claims.

Module 7: Medical Care Coordination 428—This module describes how medical care must be coordinated so injured employees receive prompt, quality care by a physician or clinic which supports the company's goal of rapid healing and return to productivity. It's important to know how medical care is selected in the user's state(s) and select the best qualified physicians and clinics to gain maximum control of the medical care employees receive. By including a physician on the team to review medical care and effectiveness of medical vendors is crucial.

Module 8: Medical Cost Containment 432—This system does not focus on reducing the cost of each medical visit, instead it strives for overall cost reduction which sometimes means paying MORE for a doctor who will spend more time with an injured employee. It's very important to know the cost containment services that the company's Third Party Administrator and insurance company provide in order to utilize the quality control process of this module such as how often services are used, the costs of services such as medical bill review, hospital bill review, utilization review, nurse case management (both telephonic and field-based), negotiated preferred provider networks, and vocational rehabilitation.

Module 9: Fraud, Abuse & Malingering 436—This module highlights the importance of understanding about fraudulent activities. Some people take advantage of the system by faking injuries or pretending they are injured more seriously than they really are. It is important to be able to spot the red flags of fraud and guide the investigators on the team. Read and review reports, videotapes and photographs. This module allows the user to learn how to coordinate investigation results with medical advisors.

Module 10: Training Initiatives 440—This module shows that all levels must understand their role and the exact steps they need to make their workers' compensation program successful. As new processes are put into place, each level of the company must know how to use the new forms and must be able to explain the new policies. This new knowledge comes from the training and education provided in the plan 244.

Referring now to FIG. 8, a flow diagram of the method of the present invention 100 showing a preferred method of the improvement plan process 244. Upon accessing the dashboard 120 the user 104 is presented with a plurality of processes 208 as described above, including the improvement plan 244. By utilizing the improvement plan 244 the user 104 has transitioned from the assessment and benchmarking analysis of the workers' compensation program to skill training, problem solving, implementing changes and improving the program parameters. The improvement plan 244 comprises a plurality of modules to educate and train the user 104 including, but not limited to, performance goals 404, post injury response procedures 408, communication 412, return to work programs & transitional duty 416, management commitment 420, fraud, abuse and malingering 436, and training initiatives 440. The improvement plan 244 provides templates and forms for implementing the various modules. Preferably the user initiates the training plan 244 at module 1 and proceeds sequentially through the modules to attain the maximum benefit from the plan 244. However, an advantage of the improvement plan 244 is that any module may be utilized independent of the others so that users of any skill level may benefit. The modules may be repeated at any time online as self-paced lessons without the need for hired consultants and classroom time, and the process 244 may be repeated as programs improvements are implemented. In addition, the improvement plan 244 may also be taught in a classroom style, or in a specialized intensive setting know as the workers' compensation boot camp. A further advantage of the improvement plan 244 is that it enables the workers' compensation program manager to identify modules for training and re-training, thereby providing enhanced flexibility for program management.

Upon completion of the cycle 108 an advantage of the web based system 100 is that the processes can be accessed at any time and the user and/or company can utilize the recommendations and changes identified and by using their own resources they can self-implement and manage a workers' compensation management cost containment program.

It is understood that the embodiments and descriptions of the invention herein described are merely instruments of the application of the invention and those skilled in the art should realize that changes may be made without departure from the essential elements and contributions to the art made by the teachings of the invention herein.

The invention claimed is:
1. An improved method of reducing the cost of an employer's workers' compensation program and managing program quality control for an employer with a plurality of operating unit comprising the steps of:
   a. assessing the efficiency of the best practices of a multi-unit employer comprising the steps of:
      i. inputting into the memory of a computer responses into a questionnaire for workplace management and workers' compensation program quality control practices comprising a plurality of company procedures and cost drivers that reflect company best practices and procedures for each unit, said best practices recognized in industry as being necessary to reduce workers' compensation costs and identify strengths and weaknesses in workplace management practices;

ii. analyzing the responses from each unit in the memory of the computer using a computer program stored in the memory of a computer;

iii. calculating by the computer a national workers' compensation management score for each unit wherein the higher the score the lesser the number of best practices recommended to be implemented and the lower the score the greater the number best practices recommended to be implemented for each unit respectively;

iv. calculating by the computer an average national workers' compensation management score for a plurality of units collectively, or the company as a whole, wherein the higher the score the lesser the number of best practices recommended to be implemented and the lower the score the greater the number best practices recommended to be implemented;

v. predicting a trend in workers' compensation cost control efficiency in each unit, a plurality of units, or the company as a whole by tracking said workers' compensation management score over time;

vi. comparing the calculated score value of one unit to a value or values calculated for one or more different units of the same company to produce a unit percentile ranking, said unit percentile ranked in a best-to-worst and worst-to-best unit hierarchy;

vii. producing a best practices profile ranking report for each unit in a company;

viii. producing a best practices gap analysis for each unit in a company;

ix. producing a report of employer-specific customized best practice recommendations for improvement by module for a multi-unit company comprising a prioritized action plan for each unit useable by the company to implement changes in the workers' compensation management best practices of each unit;

b. comparing the efficiency of the implementation by a multi-unit employer of said best practice recommendations from said action plan for each unit to national standards by data benchmarking comprising the steps of:

i. inputting into the memory of a computer data characterizing an employer's workers' compensation management practices for each unit, said data including at least the company name, the policy period, the valuation date, and one or more of the following, (a) the number and cost of existing workers' compensation claims;

(b) number of and incurred amount for lost time claims;

(c) number of and incurred amount for medical claims;

(d) incurred amount for expenses;

(e) corporate data comprising total revenue;

(f) total payroll;

(g) total number of man hours worked; and (h) profit margin and days lost;

ii. analyzing the data in the memory of the computer using a computer program stored in the memory of a computer to produce reports stored in the memory of a computer providing calculated values as dollar values, percentages or rates for each unit, said reports comprising one or more of the following, (a) average cost per workers compensation claim;

(b) average indemnity cost per lost time claim;

(c) average medical cost per lost time claim;

(d) average expense cost per lost time claim;

(e) average cost per lost time claim;

(f) average cost per medical only claim;

(g) percentage lost time claims to total;

(h) average losses as a percentage of payroll;

(i) average losses as a percentage of revenue;

(j) recordable rate;

(k) lost work day rate; and (l) average cost per full time equivalent employee;

(m) a transitional duty cost calculator; and (n) a gross sales to pay for workers' compensation costs calculator;

iii. comparing said values to national cost averages and statistics relevant to management and quality control of workers' compensation management practices;

c. comparing the efficiency of the implementation by the employer of said best practice recommendations from said action plan in returning injured employees to work in each unit comprising the steps of, i. inputting return to work employee injury data into the memory of a computer, said data comprising, (a) employee information;

(b) date of injury;

(c) date returned to work; and (d) the waiting period;

ii. analyzing said data in the memory of the computer using a computer program stored in the memory of a computer to produce reports stored in the memory of a computer comprising one or more of the following, (a) return to work ratio report;

(b) a return to work tracker;

(c) lost days; and (d) total claims;

iii. identifying individual return to work best practices for improvement and assigning goals for implementation of said best practices;

d. providing an online improvement training process for implementing recommended best practices in said action plan;

e. training users by said improvement process;

f. implementing said best practice recommendations from said action plan;

g. comparing the best practices implementation over time by periodically repeating steps (a)-(f) and inputting said scores on said score tracker in the memory of a computer;

h. revising said action plan in response to score trends, and i. inputting data characterizing new workers' compensation claims to the memory of a computer after implementing said employer-specific recommendations.

2. The method of claim 1 wherein the computer program for analyzing the responses and data is stored in the memory of a different computer than the computer in which the data is stored.

3. The method of claim 2 wherein the computer in which the computer program for analyzing the responses and data is stored accesses the computer in which the data is stored via Internet, Intranet, or other network connection.

4. The method of claim 2 wherein the computer in which the responses and data are stored accesses the computer in which the computer program for analyzing the responses and data is stored via Internet, Intranet, or other network connection.

5. The method of claim 4 wherein access to the computer in which the computer program for analyzing the responses and data is stored is secure.

6. The method of claim 4 wherein the employer is provided with a unique account identifier and accesses the computer in which the computer program for analyzing the responses and data is stored via an Internet portal that is customized for the account.

7. A computer having the computer program for analyzing the responses and data is stored that is accessed in accordance with the method of claim 4 stored therein.

8. The method claim 1 wherein said workers compensation score tracker comprises a graph where the Y axis represents score values and the X axis represents elapsed time.

9. The method of claim 1 wherein said best practices improvement plan ranks recommendations by color coding red for critical, yellow for needs improvement and green for good or acceptable.

10. The method of claim 1 wherein said best practices profile ranking displays results in percentages, the lower the rank the more improvement is required causing the user to initiate discussion of recommendation implementation strategies and identify issues for prioritization to put on a timetable in said action plan.

11. The method of claim 1 wherein said best practices gap analysis displays results in percentages of the effectiveness of the implementation of the customized recommendations from the participating divisions or operating units by the highest percentage down to the lowest percentage of effectiveness for each unit or division, wherein one hundred percent represents failure in all parameters and zero represents all units or divisions achieving the recommended best practices.

12. The method claim 1 wherein said return to work ratio comprises a graph where the Y axis represents the number of employees and the X axis represents the number of days for an employee to return to work, wherein four days or less represents effective implementation of return to work best practices.

13. The method claim 1 wherein said return to work tracker comprises a graph where the Y axis represents the calculated return to work ratio, and the X axis represents a consecutive period of time, wherein an increasing slope from plotted data indicates the return to work of as many workers as possible in as short a time as possible.

14. A computer having the responses and data stored therein for analysis in accordance with the method of claim 1.

* * * * *